United States Patent
Ishiga

(10) Patent No.: US 7,391,903 B2
(45) Date of Patent: Jun. 24, 2008

(54) IMAGE PROCESSING METHOD, IMAGE PROCESSING PROGRAM AND IMAGE PROCESSING PROCESSOR FOR INTERPOLATING COLOR COMPONENTS

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/297,434

(22) Filed: Dec. 9, 2005

(65) Prior Publication Data

US 2006/0092298 A1    May 4, 2006

Related U.S. Application Data

(63) Continuation of application No. PCT/JP2004/008110, filed on Jun. 10, 2004.

(30) Foreign Application Priority Data

Jun. 12, 2003    (JP)    ............................... 2003-167923

(51) Int. Cl.
  G06K 9/00    (2006.01)
  G09G 5/00    (2006.01)
  G03F 3/08    (2006.01)
(52) U.S. Cl. .................... 382/167; 382/162; 345/606; 358/518; 358/520; 358/521
(58) Field of Classification Search ................ 382/162, 382/167, 275; 345/604; 358/518–521
See application file for complete search history.

(56) References Cited

U.S. PATENT DOCUMENTS

| 4,802,107 | A | * | 1/1989 | Yamamoto et al. .......... 382/141 |
| 5,382,976 | A | | 1/1995 | Hibbard |
| 5,629,734 | A | | 5/1997 | Hamilton, Jr. et al. |
| 5,991,056 | A | * | 11/1999 | Takamori .................... 358/523 |
| 6,421,084 | B1 | | 7/2002 | Chang et al. |
| 6,542,187 | B1 | | 4/2003 | Hamilton, Jr. et al. |
| 6,631,206 | B1 | * | 10/2003 | Cheng et al. ................. 382/164 |
| 6,671,401 | B1 | | 12/2003 | Adams, Jr. et al. |
| 6,687,414 | B1 | * | 2/2004 | Edgar ......................... 382/275 |
| 6,697,107 | B1 | | 2/2004 | Hamilton, Jr. et al. |
| 6,980,326 | B2 | | 12/2005 | Tsuchiya et al. |
| 7,088,392 | B2 | * | 8/2006 | Kakarala et al. ............ 348/272 |

(Continued)

FOREIGN PATENT DOCUMENTS

JP    04252667    A    *    9/1992

(Continued)

Primary Examiner—Matthew Bella
Assistant Examiner—Yubin Hung
(74) Attorney, Agent, or Firm—Oliff & Berridge, PLC

(57) ABSTRACT

An image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, includes: a color difference information generation step in which color difference information is generated by using color information in the first image; a color gradient analysis step in which a color gradient indicating an extent of color change is determined based upon the color difference information having been generated; and an image conversion step in which the first image is converted to the second image based upon the color gradient having been determined.

26 Claims, 14 Drawing Sheets

U.S. PATENT DOCUMENTS

| | | |
|---|---|---|
| 7,116,819 B2 * | 10/2006 | Zhang ..................... 382/162 |
| 2002/0051569 A1 | 5/2002 | Kita |
| 2003/0067548 A1 | 4/2003 | Sugimori |
| 2004/0080639 A1 | 4/2004 | Ishiga |
| 2004/0141072 A1 * | 7/2004 | Nilsson et al. ............. 348/272 |

FOREIGN PATENT DOCUMENTS

| | | |
|---|---|---|
| JP | A 10-200906 | 7/1998 |
| JP | A 11-103466 | 4/1999 |
| JP | A 11-177999 | 7/1999 |
| JP | B2 3028553 | 2/2000 |
| JP | A 2001-061157 | 3/2001 |
| JP | A 2001-245314 | 9/2001 |
| JP | B2 3252422 | 11/2001 |
| JP | A 2002-359856 | 12/2002 |
| JP | A 2003-061105 | 2/2003 |
| JP | A 2003-102025 | 4/2003 |
| JP | A 2003-163939 | 6/2003 |
| WO | WO 02/060186 A1 | 8/2002 |
| WO | WO 02/071761 A1 | 9/2002 |
| WO | WO 03/101119 A1 | 12/2003 |

* cited by examiner

FIG.2

| COORDINATES [i, j] | i-3 | i-2 | i-1 | i | i+1 | i+2 | i+3 |
|---|---|---|---|---|---|---|---|
| j-3 | B | G | B | G | B | G | B |
| j-2 | G | R | G | R | G | R | G |
| j-1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

FIG.3

| COORDINATES [i, j] | i-3 | i-2 | i-1 | i | i+1 | i+2 | i+3 |
|---|---|---|---|---|---|---|---|
| j-3 | R | G | R | G | R | G | R |
| j-2 | G | B | G | B | G | B | G |
| j-1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

FIG.4

| COORDINATES [i, j] | i-3 | i-2 | i-1 | i | i+1 | i+2 | i+3 |
|---|---|---|---|---|---|---|---|
| j-3 | G | B | G | B | G | B | G |
| j-2 | R | G | R | G | R | G | R |
| j-1 | G | B | G | B | G | B | G |
| j | R | G | R | G | R | G | R |
| j+1 | G | B | G | B | G | B | G |
| j+2 | R | G | R | G | R | G | R |
| j+3 | G | B | G | B | G | B | G |

FIG.5

| COORDINATES [i, j] | i-3 | i-2 | i-1 | i | i+1 | i+2 | i+3 |
|---|---|---|---|---|---|---|---|
| j-3 | G | R | G | R | G | R | G |
| j-2 | B | G | B | G | B | G | B |
| j-1 | G | R | G | R | G | R | G |
| j | B | G | B | G | B | G | B |
| j+1 | G | R | G | R | G | R | G |
| j+2 | B | G | B | G | B | G | B |
| j+3 | G | R | G | R | G | R | G |

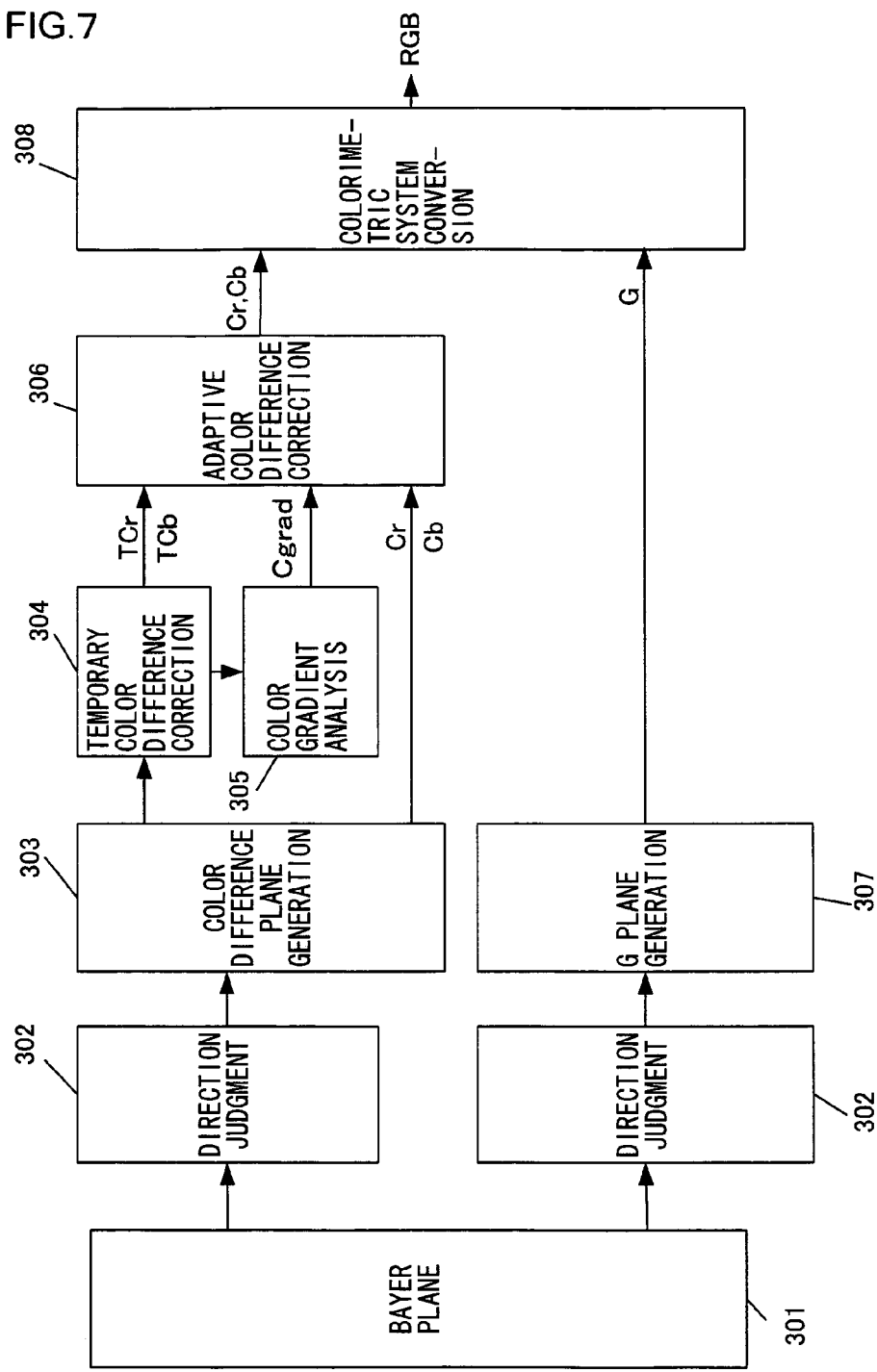

grad= grad=

FIG.15 COLOR DIFFERENCE LOW-PASS FILTER 1

FIG.18 DIRECTIONAL INDEX DIAGRAM
Directional Index [HV,DN]

G POSITION BRIGHTNESS GENERATION COEFFICIENT PATTERN $Y_G$

|  | $\beta/4$ |  |
|---|---|---|
| $\beta/4$ | $\alpha$ | $\beta/4$ |
|  | $\beta/4$ |  |

FIG.20

R, B POSITION BRIGHTNESS GENERATION COEFFICIENT PATTERNS $Y_{RB}v45$
(HV,DN)=(1,1)

|  | $\alpha u_1$ | $\beta t_1/2$ |
|---|---|---|
|  | $\beta/2$ |  |
| $\beta t_2/2$ | $\alpha u_2$ |  |

$Y_{RB}v$
(HV,DN)=(1,0)

| $\beta s_1/4$ | $\alpha u_1$ | $\beta t_1/4$ |
|---|---|---|
|  | $\beta/2$ |  |
| $\beta t_2/4$ | $\alpha u_2$ | $\beta s_2/4$ |

$Y_{RB}v135$
(HV,DN)=(1,-1)

| $\beta s_1/2$ | $\alpha u_1$ |  |
|---|---|---|
|  | $\beta/2$ |  |
|  | $\alpha u_2$ | $\beta s_2/2$ |

$Y_{RB}45$
(HV,DN)=(0,1)

|  | $\alpha u_1/2$ | $\beta t_1/2$ |
|---|---|---|
| $\alpha v_1/2$ | $\beta/2$ | $\alpha v_2/2$ |
| $\beta t_2/2$ | $\alpha u_2/2$ |  |

$Y_{RB}UNIb$
(HV,DN)=(0,0)

| $\beta s_1/4$ | $\alpha u_1/2$ | $\beta t_1/4$ |
|---|---|---|
| $\alpha v_1/2$ | $\beta/2$ | $\alpha v_2/2$ |
| $\beta t_2/4$ | $\alpha u_2/2$ | $\beta s_2/4$ |

$Y_{RB}135$
(HV,DN)=(0,-1)

| $\beta s_1/2$ | $\alpha u_1/2$ |  |
|---|---|---|
| $\alpha v_1/2$ | $\beta/2$ | $\alpha v_2/2$ |
|  | $\alpha u_2/2$ | $\beta s_2/2$ |

$Y_{RB}h45$
(HV,DN)=(-1,1)

|  |  | $\beta t_1/2$ |
|---|---|---|
| $\alpha v_1$ | $\beta/2$ | $\alpha v_2$ |
| $\beta t_2/2$ |  |  |

$Y_{RB}h$
(HV,DN)=(-1,0)

| $\beta s_1/4$ |  | $\beta t_1/4$ |
|---|---|---|
| $\alpha v_1$ | $\beta/2$ | $\alpha v_2$ |
| $\beta t_2/4$ |  | $\beta s_2/4$ |

$Y_{RB}h135$
(HV,DN)=(-1,-1)

| $\beta s_1/2$ |  |  |
|---|---|---|
| $\alpha v_1$ | $\beta/2$ | $\alpha v_2$ |
|  |  | $\beta s_2/2$ |

FIG.21

EDGE EMPHASIS FILTER (LAPLACIAN)

| -1 | -1 | -1 |
|---|---|---|
| -1 | 8 | -1 |
| -1 | -1 | -1 |

/16

IMAGE PROCESSING METHOD, IMAGE PROCESSING PROGRAM AND IMAGE PROCESSING PROCESSOR FOR INTERPOLATING COLOR COMPONENTS

This application is a continuation of International Application No. PCT/JP2004/008110 filed Jun. 10, 2004.

INCORPORATION BY REFERENCE

The disclosures of the following priority applications are herein incorporated by reference:
Japanese Patent Application No. 2003-167923 filed Jun. 12, 2003; and
International Application No. PCT/JP2004/008110 filed Jun. 10, 2004.

BACKGROUND OF THE INVENTION

1. Field of the Invention

The present invention relates to an image processing method through which a high-resolution digital color image with high image quality is generated.

2. Description of Related Art

Color artifacts are bound to occur following color interpolation processing on color image data obtained by spatially sampling color components with a single-plate color image sensor or the like. International Publication WO 02/060186 discloses a method for adaptively eliminating color artifacts manifesting in such color image data without destroying the image structure and, more particularly, the color structure represented by the color image data (invented by the inventor of the present invention). In this method, color artifact elimination is executed to a greater extent in an achromatic area and is executed to a lesser extent in a chromatic area based upon the results of a color judgment executed by using a color index calculated based upon color difference signals.

SUMMARY OF THE INVENTION

However, the method disclosed in International Publication WO 02/060186 has a problem to be addressed in that it does not provide a very effective solution to color artifacts manifesting in a chromatic image area. In particular, when the amplitude of color artifacts increases in a high ISO sensitivity photographic image, color artifacts manifest in the form of color mottling over chromatic areas and achromatic areas alike. This gives rise to a problem in that color artifacts may not be fully eliminated over the entire image.

According to the 1st aspect of the invention, an image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprises: a color difference information generation step in which color difference information is generated by using color information in the first image; a color gradient analysis step in which a color gradient indicating an extent of color change is determined based upon the color difference information having been generated; and an image conversion step in which the first image is converted to the second image based upon the color gradient having been determined.

According to the 2nd aspect of the invention, in the image processing method according to the 1st aspect, it is preferred that: the image conversion step includes a color difference information correction step in which correction processing is executed based upon the color gradient on the color difference information having been generated by using the color information in the first image.

According to the 3rd aspect of the invention, in the image processing method according to the 2nd aspect, it is preferred that: in the color gradient analysis step, a color index is generated based upon color difference information indicating a color difference between the color components making up the colorimetric system used to express the first image and the color gradient is determined by ascertaining the extent of color change within a plane of the color index.

According to the 4th aspect of the invention, in the image processing method according to the 1st aspect, it is preferred that: the plurality of pixels constituting the first image and the plurality of pixels constituting the second image are arrayed in matching positional arrangements to achieve a direct correspondence; and in the image conversion step, the first image is converted to the second image by adjusting a contribution factor of the color information in the first image present at a position corresponding to a position of a processing target pixel in the second image in correspondence to the steepness of color gradient.

According to the 5th aspect of the invention, in the image processing method according to the 4th aspect, it is preferred that: in the color gradient analysis step, a color index is generated by using color difference information indicating a color difference between a color component constituting the colorimetric system used to express the first image and a color component corresponding to an opposite color and the color gradient is determined by ascertaining the extent of color change within a plane of the color index.

According to the 6th aspect of the invention, an image processing method comprises: an image input step in which a second image, obtained through a process of converting a first image expressed in a colorimetric system made up of a plurality of color components with color information corresponding to at least one color component missing at each pixel to an image with all pixels thereof holding color information corresponding to at least two common color components, is input; a color difference information generation step in which color difference information is generated by using color information in the second image; a color gradient analysis step in which a color gradient indicating an extent of color change is determined based upon the color difference information having been generated; and a color difference information correction step in which the color difference information corresponding to the second image is corrected based upon the color gradient having been determined.

According to the 7th aspect of the invention, in the image processing method according to the 1st or 6th aspect, it is preferred that: in the color gradient analysis step, a color index to be used to evaluate color in correspondence to each pixel is generated based upon the color difference information and the color gradient is determined based upon the color index having been generated.

According to the 8th aspect of the invention, in the image processing method according to the 7th aspect, it is preferred that: in the color gradient analysis step, the color gradient is determined by executing a differentiation operation to determine a gradient within a plane of the color index having been generated.

According to the 9th aspect of the invention, in the image processing method according to the 7th aspect, it is preferred that: in the color difference information generation step, a plurality of types of color difference information are generated in correspondence to a single processing target pixel; and in the color gradient analysis step, the color index is generated by using color difference information indicating color differences among at least three color components in correspondence to a specific combination of the plurality of types of color difference information.

According to the 10th aspect of the invention, an image processing method comprises: an image input step in which a second image, obtained through a process of converting a first image expressed in a colorimetric system made up of a plurality of color components with color information corresponding to at least one color component missing at each pixel to an image with all pixels thereof holding color information corresponding to at least three common color components, is input; a chromaticity information generation step in which chromaticity information is generated through color space conversion executed on the second image; a color gradient analysis step in which a color gradient indicating an extent of color change is determined based upon the chromaticity information having been generated; and a color difference information correction step in which color difference information contained in the second image is corrected based upon the color gradient having been determined.

According to the 11th aspect of the invention, in the image processing method according to any of the 2nd, 6th and 10th aspects, it is preferred that: in the color difference information correction step, a correction filter effective over a predetermined range is applied to a color difference plane if a target pixel has a color gradient smaller than a predetermined value, and no correction processing is executed or a correction filter effective over a range narrower than the predetermined range is applied if the target pixel has a color gradient greater than the predetermined value.

According to the 12th aspect of the invention, in the image processing method according to the 11th aspect, it is preferred that: a differentiation filter used to determine the color gradient in the color gradient analysis step has a size matching the size of the correction filter effective over the predetermined range.

According to the 13th aspect of the invention, in the image processing method according to any of the 1st, 6th and 10th aspects, it is preferred that: in the color gradient analysis step, the color gradient is determined by isotropically executing a differentiation operation along a plurality of directions.

According to the 14th aspect of the invention, in the image processing method according to the 11th aspect, it is preferred that: in the color gradient analysis step, the color gradient is calculated through a first-order differentiation operation.

According to the 15th aspect of the invention, in the image processing method according to the 4th aspect, it is preferred that: in the image conversion step, the contribution factor of the color information in the first image at the position corresponding to the position of the processing target pixel in the second image, with which the color information in the first image is to be allowed to affect color information corresponding to a color component carrying luminance in the second image, is adjusted in correspondence to the color gradient.

According to the 16th aspect of the invention, in the image processing method according to the 15th aspect, it is preferred that: in the image conversion step, the first image is converted to the second image by adopting at least a first method through which color information corresponding to one color component in the second image is generated by using color information corresponding to a plurality of color components in the first image and a second method through which color information corresponding to one color component in the second image is generated by using color information corresponding to one color component in the first image; in the color gradient analysis step, a decision is made as to whether or not a color boundary is present based upon the color gradient having been determined; and in the color conversion step, the first method is adopted to process a pixel determined not to contain the color boundary through the color gradient analysis step and the second method is adopted to process a pixel determined to contain the color boundary through the color gradient analysis step.

According to the 17th aspect of the invention, in the image processing method according to the 16th aspect, it is preferred that: when the first method is adopted in the image conversion step, color information corresponding to the color component carrying luminance in the first image is generated for a pixel at which color information corresponding to the color component is missing through interpolation processing executed by using color information corresponding to a color component matching the color component and color information corresponding to a color component other than the color component, and the first image is converted to the second image by using the color information corresponding to the color component carrying the luminance in the first image having been generated through the interpolation processing.

According to the 18th aspect of the invention, in the image processing method according to the 17th aspect, it is preferred that: when the first method is adopted in the image conversion step, color information corresponding to the color component carrying luminance in a colorimetric system other than the colorimetric system used to express the first image is generated for all the pixels by using the color information corresponding to the color components making up the first image and the first image is converted to the second image by using the color information corresponding to the color component carrying the luminance in the other colorimetric system having been generated.

According to the 19th aspect of the invention, in the image processing method according to the 1st aspect, it is preferred that: in the color difference information generation step, the color difference information is generated by adopting a method selected from at least three different methods.

According to the 20th aspect of the invention, in the image processing method according to the 19th aspect, it is preferred that: in the color difference information generation step, similarity factors corresponding to at least two directions are calculated by using the color information in the first image, similarity manifesting along each direction is judged among at least three different classifications based upon the similarity factors having been calculated and one of the three different methods is selected in correspondence to a judged classification.

According to the 21st aspect of the invention, an image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprises: a color difference information generation step in which color difference information for the second image is generated by using color information in the first image; a color gradient analysis step in which a color gradient indicating an extent of color change is determined based upon the color difference information having been generated for the second image; and a color difference information correction step in which the color difference information for the second image is corrected based upon the color gradient having been determined, and in the color difference correction step, the color difference information for the second image is corrected independently of luminance information for the second image.

According to the 22nd aspect of the invention, an image processing method comprises: an image input step in which a second image, obtained through a process of converting a first image expressed in a colorimetric system made up of a plurality of color components with color information corresponding to at least one color component missing at each pixel to an image with all pixels thereof holding color information corresponding to at least two common color components, is input; a color difference information generation step in which color difference information is generated by using color information in the second image; a color gradient analysis step in which a color gradient indicating an extent of color change is determined is based upon the color difference information having been generated; and a color difference information correction step in which the color difference information corresponding to the second image is corrected based upon the color gradient having been determined, independently of luminance information for the second image.

According to the 23rd aspect of the invention, an image processing method comprises: an image input step in which a second image, obtained through a process of converting a first image expressed in a colorimetric system made up of a plurality of color components with color information corresponding to at least one color component missing at each pixel to an image with all pixels thereof holding color information corresponding to at least three common color components, is input; a chromaticity information generation step in which chromaticity information is generated through color space conversion executed on the second image; a color gradient analysis step in which a color gradient indicating an extent of color change is determined base upon the chromaticity information having been generated; and a color difference information correction step in which color difference information contained in the second image is corrected based upon the color gradient having been determined, independently of luminance information contained in the second image.

According to the 24th aspect of the invention, an image processing method comprises: an image input step in which an image, constituted with a plurality of pixels all holding color information corresponding to at least two common color components, is input; a color conversion step in which color information corresponding to the color components making up the image is converted to luminance information and color difference information; a color gradient analysis step in which a color gradient indicating an extent of color change is determined based upon the color difference information; and a color difference information correction step in which the color difference information is corrected based upon the color gradient having been determined, independently of the luminance information.

According to the 25th aspect of the invention, in the image processing method according to any of the 21st through 24th aspects, it is preferred that: in the color difference information correction step, a range of color information to be used in color difference correction is determined in correspondence to a range of detection executed to determine the color gradient in the color gradient analysis step.

According to the 26th aspect of the invention, in the image processing method according to any of the 21st, 22nd and 24th aspects, it is preferred that: in the color gradient analysis step, the color difference information having been generated in the color difference information generation step is corrected before determining the color gradient.

According to the 27th aspect of the invention, an image processing method for converting a first image which is expressed in a colorimetric system made up of a plurality of color components and is constituted of a plurality of pixels each holding color information corresponding to a single color component to a second image constituted with a plurality of pixels all holding color information corresponding to at least one common color component, comprises: a first color information generation step in which color information corresponding to a color component different from the color components making up the colorimetric system used to express the first image is generated by using color information corresponding to the plurality of color components making up the first image; a second color information generation step in which color information corresponding to a color component matching a color component in the colorimetric system used to express the first image is generated by using color information corresponding to one color component in the first image; and a color information composition step in which, depending upon a pixel position, the color information having been generated through the first color information generation step or the color information having been generated through the second color information generation step is used selectively, or the color information having been generated through the first color information generation step and the color information having been generated through the second color information generation step are both used for weighted composition.

According to the 28th aspect of the invention, in the image processing method according to the 27th aspect, it is preferred that: in the first color information generation step, color information corresponding to a luminance component different from a luminance component in the colorimetric system used to express the first image is generated.

According to the 29th aspect of the invention, in the image processing method according to the 28th aspect, it is preferred that: in the first color information generation step, color information corresponding to a color difference component different from the color components in the colorimetric system used to express the first image is generated, and the color information thus generated, combined with the color information corresponding to the luminance component different from the luminance component in the colorimetric system used to express the first image, is converted to color information corresponding to a color component representing the luminance in the colorimetric system used to express the first image.

According to the 30th aspect of the invention, in the image processing method according to any of the 27th through 29th aspects, it is preferred that: in the second color information generation step, color information corresponding to a color component representing the luminance in the colorimetric system used to express the first image is generated.

According to the 31st aspect of the invention, in the image processing method according to any of the 28th through 30th aspects, it is preferred that: in the first color information generation step, the color information corresponding to the luminance component different from the luminance component in the colorimetric system used to express the first image is generated by adopting a method selected from at least nine different methods.

According to the 32nd aspect of the invention, in the image processing method according to the 30th aspect, it is preferred that: in the second color information generation step, the color information corresponding to the color component representing the luminance is generated by adopting a method selected from at least three different methods.

According to the 33rd aspect of the invention, in the image processing method according to the 31st aspect, it is preferred that: in the first color information generation step, similarity factors corresponding to at least four directions are calculated by using the color information in the first image, similarity manifesting along each direction is judged among at least nine different classifications based upon the similarity factors having been calculated and one of the nine different methods is selected in correspondence to a judged classification.

According to the 34th aspect of the invention, in the image processing method according to the 32nd aspect, it is preferred that: in the second color information generation step, similarity factors corresponding to at least two directions are calculated by using the color information in the first image, similarity manifesting along each direction is judged among at least three different classifications based upon the similarity factors having been calculated and one of the three different methods is selected in correspondence to a judged classification.

According to the 35th aspect of the invention, in the image processing method according to any of the 27th through 34th aspects, it is preferred that: there are further provided a color difference information generation step in which color difference information is generated based upon the color information in the first image, and a color gradient analysis step in which a color gradient indicating an extent of color change is determined based upon the color difference information having been determined; and in the color information composition step, either the color information generated through the first color information generation step or the color information generated through the second color information generation step is selectively used or the color information generated through the first color information generation step and the color information generated through the second color information generation step are both used for weighted composition at each pixel position based upon the color gradient having been determined.

According to the 36th aspect of the invention, a computer-readable computer program product contains an image processing program that enables a computer to execute the steps in an image processing method according to any of the 1st through 35th aspects.

According to the 37th aspect of the invention, the computer-readable computer program product according to the 36th aspect is a recording medium on which the image processing program recorded.

According to the 38th aspect of the invention, an image processing apparatus comprises: a control device that executes the steps in an image processing method according to any of the 1st through 35th aspects.

BRIEF DESCRIPTION OF THE DRAWINGS

FIG. 2 shows image data that contain R-component color information at the conversion target pixel [i,j];

FIG. 3 shows image data that contain B-component color information at the conversion target pixel [i,j];

FIG. 4 shows image data that contain G-component color information at the conversion target pixel [i,j];

FIG. 5 shows image data that contain G-component color information at the conversion target pixel [i,j];

FIG. 7 is a block diagram provided to facilitate an explanation of the relationship among the various types of processing executed in the first embodiment;

FIG. 8 presents an example of a 5×5 pixel separable filter;

FIG. 15 shows the color difference correction low-pass filter;

FIG. 18 shows nine different classifications made in correspondence to directional indices;

FIG. 20 shows the positions of, and the coefficients assigned to the pixels used in correspondence to specific directional indices when processing an R pixel or a B pixel as the conversion target pixel (R/B-position luminance generation coefficient patterns);

FIG. 21 shows the edge emphasis filter; and

FIG. 22 shows how the program may be provided in a recording medium such as a CD-ROM or through a data signal on the Internet or the like.

DESCRIPTION OF PREFERRED EMBODIMENT(S)

First Embodiment (Structure of Electronic Camera)

Figure 1:
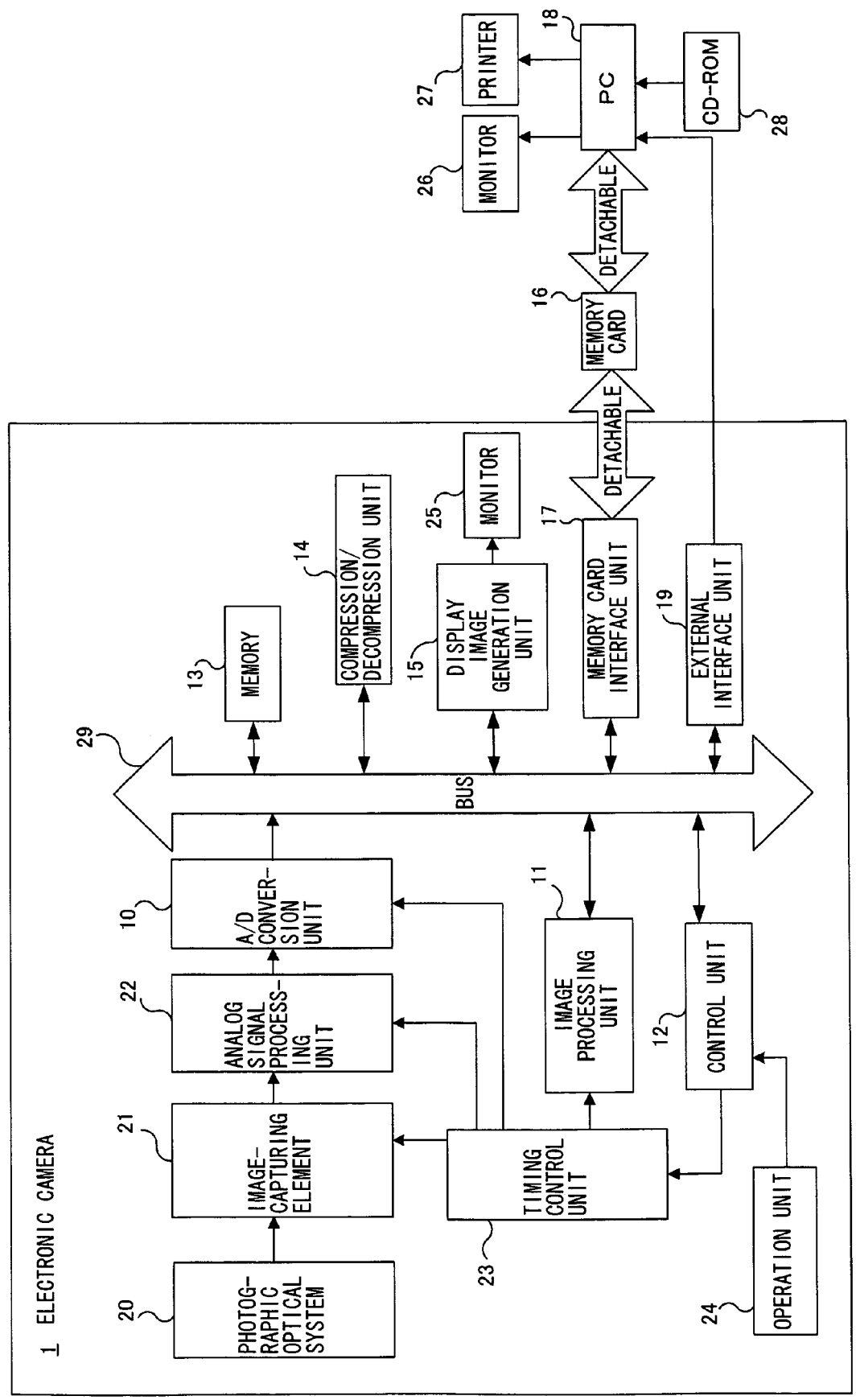
FIG. 1 is a functional block diagram of the electronic camera achieved in a first embodiment.

FIG. 1 is a functional block diagram of the electronic camera achieved in the first embodiment. The electronic camera 1 comprises an A/D conversion unit 10, an image processing unit 11, a control unit 12, a memory 13, a compression/decompression unit 14 and a display image generation unit 15. It also includes a memory card interface unit 17 used to achieve interface with a memory card (a card-type removable memory) 16 and an external interface unit 19 used to achieve interface with an external apparatus such as a PC (personal computer) 18 via a specific type of cable or a wireless transmission path. These blocks are connected with one another via a bus 29. The image processing unit 11 may be constituted with, for instance, a single-chip microprocessor dedicated to image processing.

The electronic camera 1 further comprises a photographic optical system 20, an image sensor (or an image-capturing device) 21, an analog signal processing unit 22 and a timing control unit 23. An optical image of the subject obtained at the photographic optical system 20 is formed at the image sensor 21, and the output of the image sensor 21 is connected to the analog signal processing unit 22. The output of the analog signal processing unit 22 is connected to the A/D conversion unit 10. The output of the control unit 12 is connected to the timing control unit 23, whereas the output of the timing control unit 23 is connected to the image sensor 21, the analog signal processing unit 22, the A/D conversion unit 10 and the image processing unit 11. The image sensor 21 may be, for instance, a single-plate CCD.

The electronic camera 1 further includes an operation unit 24, which is equivalent to a shutter release button, a selector button operated to switch modes and the like, and a monitor 25. The output of the operation unit 24 is connected to the control unit 12, and the output of the display image generation unit 15 is connected to the monitor 25.

It is to be noted that an application program recorded in a CD-ROM 28 is preinstalled in the PC 18 connected with a monitor 26, a printer 27 and the like. In addition, the PC 18 includes a memory card interface unit (not shown) used to achieve interface with the memory card 16 and an external interface unit (not shown) used to achieve interface with an external apparatus such as the electronic camera 1, in addition to a CPU, a memory and a hard disk (not shown).

As the operator selects a photographing mode and presses the shutter release button via the operation unit 24 in the electronic camera 1 adopting the structure shown in FIG. 1, the control unit 12 engages the timing control unit 23 to execute timing control for the image sensor 21, the analog signal processing unit 22 and the A/D conversion unit 10. The image sensor 21 generates image signals corresponding to the optical image. The image signals then undergo a predetermined type of signal processing at the analog signal processing unit 22, are digitized at the A/D conversion unit 10 and then are provided to the image processing unit 11 as image data.

In the electronic camera 1 achieved in the embodiment, color filters corresponding to R (red), G (green) and B (blue) color components are disposed in the Bayer array at the image sensor 21 and, accordingly, the image data provided to the image processing unit 11 are expressed in the RGB colorimetric system. Each of the pixels constituting the image data contains color information corresponding to one color component among R, G and B.

In addition to executing image data conversion processing to be detailed later, the image processing unit 11 executes image processing such as gradation conversion and edge emphasis on the image data. The image data having undergone the image processing are then compressed in a predetermined format at the compression/decompression unit 14 as necessary and are recorded into the memory card 16 via the memory card interface unit 17.

It is to be noted that once the image processing is completed, the image data may be directly recorded into the memory card 16 without undergoing the compression processing, or may be converted to data expressed in the colorimetric system adopted in the monitor 26 or the printer 27 connected to the PC 18 and provided to the PC 18 via the external interface unit 19. In addition, when a reproduction mode is selected by the user via the operation unit 24, image data recorded in the memory card 16 are read out via the memory card interface unit 17, decompressed at the compression/decompression unit 12 and displayed at the monitor 25 via the display image generation unit 15.

It is to be noted that instead of displaying the image data having undergone the decompression processing at the monitor 25, the image data may be converted to image data expressed in the colorimetric system adopted at the monitor 26 or the printer 27 connected to the PC 18 and provided to the PC 18 via the external interface unit 19. Furthermore, the processing executed to convert image data having undergone the conversion processing to be detailed later to image data expressed in the colorimetric system adopted at the monitor 25 or 26 or the printer 27 can be achieved by adopting a known technology.

(Conversion of Image Data)

Next, the processing executed to convert image data expressed in the RGB colorimetric system, which are obtained via the image sensor 21, to high-definition, high-quality image data is explained. The image data initially captured at the image sensor 21 and input to the image processing unit 11 after undergoing the processing at the analog signal processing unit 22 and the A/D conversion unit 10 are expressed in the RGB colorimetric system adopting a Bayer array and contain information on a single color component in correspondence to each pixel, as explained earlier, as if the information related to the color image of the subject were sub-sampled into a pattern corresponding to a Bayer array. In the subsequent description, these image data may be referred to as pre-conversion RGB image data. The pre-conversion RGB image data are converted to high-definition, high-quality image data containing information corresponding to the R-component, the G-component and the B-component at each pixel, as if to generate and restore the high-definition image data with high image quality from the sub-sampled image data.

FIGS. 2 through 5 illustrate pre-conversion RGB image data. FIGS. 2 through 5 each show the color component distribution at pixels surrounding a conversion target pixel holding information corresponding to a specific color component. [i,j] indicates the coordinates of the conversion target pixel. The conversion target pixel [i,j] holds R-component color information in FIG. 2, and the conversion target pixel [i,j] holds B-component color information in FIG. 3. In FIG. 4, the pixels that are adjacent along the vertical direction to the conversion target pixel [i,j] holding G-component color information, hold B-component color information and the pixels that are adjacent along the horizontal direction to the conversion target pixel hold R-component color information. In FIG. 5, the pixels that are adjacent along the vertical direction to the conversion target pixel [i,j] holding G-component color information, hold R-component color information and the pixels that are adjacent along the horizontal direction to the conversion target pixel hold B-component color information.

Among the pixels constituting the pre-conversion RGB image data, a pixel holding R-component color information is referred to as an R pixel, a pixel holding B-component color information is referred to as a B pixel and a pixel holding G-component color information is referred to as a G pixel.

Figure 6:
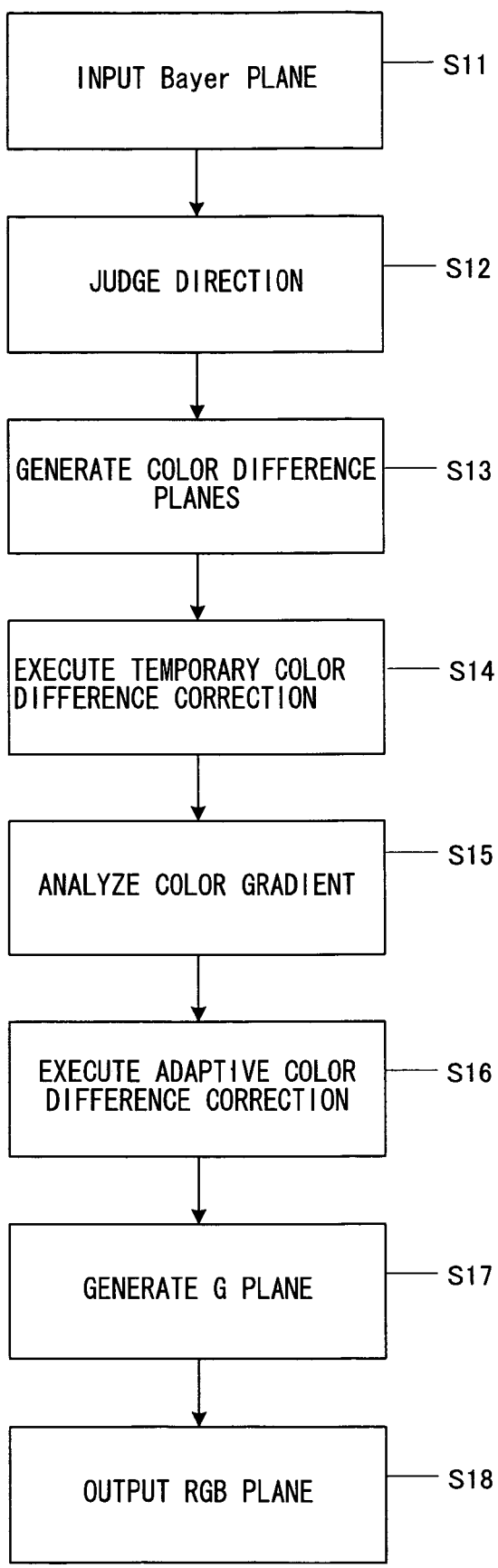
FIG. 6 presents a schematic flowchart of the image data conversion processing executed by the image processing unit.

FIG. 6 presents a schematic flowchart of the image data conversion processing executed by the image processing unit 11. FIG. 7 is a block diagram provided to facilitate an explanation of the relationship among the various types of processing. In reference to FIGS. 6 and 7, the image data conversion processing executed by the image processing unit 11 in the first embodiment is summarized.

Based upon the statistically substantiated fact that the rates of color change attributable to color moiré, color mottling and the like are extremely small compared to the rates of color change occurring in colors actually present in the subject, adaptive color artifact elimination processing is executed by using a color gradient as an index in the image data conversion processing in the first embodiment. The adaptive color artifact elimination is executed specifically within a Bayer interpolation. It is to be noted that the specific processing executed in each step is to be explained in further detail later.

In step S11, a Bayer plane (301 in FIG. 7), i.e., the pre-conversion RGB image data, is input. In step S12, similarity factors are calculated and vertical/horizontal direction judgment is executed (302 in FIG. 7). In step S13, based upon the results of the vertical/horizontal direction judgment, a Cr plane and a Cb plane are generated, i.e., color difference information Cr and Cb are generated in correspondence to each pixel by using the color information corresponding to the individual color components contained in the pre-conversion RGB image data (303 in FIG. 7).

In step S14, a temporary color difference correction is executed in order to ensure that when the color gradient is classified as the index, a color artifact boundary is not erroneously recognized as a color boundary (304 in FIG. 7). In step S15, a color gradient analysis is executed by using the color difference information Cr and Cb (305 in FIG. 7). In step S16, a decision is made as to whether or not to execute color difference correction processing in correspondence to the color gradient (306 and FIG. 7). The color difference correction executed in step S16 is referred to as adaptive color difference correction. The word "adaptive" used in this context means "executed as needed". Through the adaptive color difference correction, the correction is executed or not executed depending upon specific conditions for optimal results.

In step S17, a G plane is generated based upon the results of the direction judgment executed in step S12 (307 in FIG. 7). Namely, color information corresponding to the G color component is generated for all the pixels through interpolation processing. In step S18, the image data are converted to image data expressed in the RGB colorimetric system (308 in FIG. 7) based upon the Cr plane and the Cb plane from step S16 and the G plane having been generated in step S17, and the image data resulting from the conversion are output. The image data thus output undergo various types of image processing and are stored into memory or the like.

It is to be noted that the number of pixels constituting the pre-conversion RGB image data and the number of pixels constituting the post-conversion image data are equal to each other and the positions of the pre-conversion pixels and the post-conversion pixels have a one-to-one correspondence on a two-dimensional plane. The image data conversion processing described above is executed for all the pixels by repeatedly executing image data conversion processing in different target local areas. Accordingly, the following explanation is given by quoting relational expressions indicating relationships locally applicable in individual target areas. Various aspects of the processing are explained in detail below.

1 Direction Judgment 1-1 Calculation of Similarity Factors

By using the color information corresponding to the individual color components contained in the pre-conversion RGB image data having been input, similarity factors are calculated and vertical/horizontal direction judgment is executed. First, the similarity factors are calculated for each of the R pixels and the B pixels. The term "similarity factor" refers to a numerical value indicating the level of similarity manifesting between the conversion target pixel and surrounding pixels, which is calculated by using the color component information within a local area containing the conversion target pixel. In the embodiment, similarity factors are calculated along the vertical direction and the horizontal direction and a decision is made as to whether the similarity along the vertical direction or the similarity along the horizontal direction is more pronounced. A set of color information indicates a value obtained by digitizing a color signal provided by the image sensor 21 through predetermined processing. Such a value may be indicated by using, for instance, 256 gradations one byte data.

When the coordinates of a given pixel are indicated by [x,y], [i,j] represents the coordinates of the conversion target pixel. G[x,y] indicates the color information at a G pixel, R[x,y] indicates the color information at an R pixel, B[x,y] indicates the color information at a B pixel and Z[x,y] collectively represents either the color information at an R pixel or the color information at a B pixel. The similarity factor Cv[i,j] along the vertical direction can be calculated as expressed in (1), and the similarity factor Ch[i,j] along the horizontal direction can be calculated as expressed in (2).

$$Cv[i,j] = \{(|G[i,j-1]-Z[i,j]|+|G[i,j+1]-Z[i,j]|)/2 + |G[i,j-1]-G[i,j+1]|\}/2 \quad (1)$$

$$Ch[i,j] = \{(|G[i-1,j]-Z[i,j]|+|G[i+1,j]-Z[i,j]|)/2 + ||G[i-1,j]-G[i+1,j]|\}/2 \quad (2)$$

It is to be noted that the similarity factors should be calculated by adopting an optimal method among the various methods having been proposed to date in conjunction with the embodiment.

1-2 Similarity Judgment

Next, a similarity judgment is executed. Based upon Cv[i,j] and Ch[i,j] having been calculated as described above, the type of similarity manifesting with regard to the conversion target pixel is judged. Namely, a decision is made as to whether pronounced similarity manifests along the vertical direction or the horizontal direction, or if pronounced similarity cannot be discerned along the vertical direction or the horizontal direction. More specifically, if the condition expressed in (3) is satisfied, it is determined that the direction of pronounced similarity, i.e., either the vertical direction or the horizontal direction, is not clear, and 0 is set for a directional index HV[i,j]. In other words, if the difference between the vertical similarity factor and the horizontal similarity factor is equal to or less than a threshold value Th1, it cannot be determined whether more pronounced similarity manifests along the vertical direction or the horizontal direction. Th1 is a predetermined threshold value which assumes a value of approximately 10 in correspondence to the 256 gradations. It should be set to a somewhat higher value if a great deal of noise is present in the image.

$$|Cv[i,j]-Ch[i,j]| \leq Th1 \quad (3)$$

If the condition expressed in (3) is not satisfied, i.e., if it is decided that more pronounced similarity manifests either along the vertical direction or the horizontal direction, a decision is made as to whether or not the condition expressed in (4) is satisfied. If the condition (4) is satisfied, it is determined that more pronounced similarity manifests along the vertical direction and 1 is set for the directional index HV[i,j]. If the condition (4) is not satisfied, it is determined that more pronounced similarity manifests along the horizontal direction and accordingly, −1 is set for the directional index HV[i,j]. It is to be noted that a higher level of similarity is indicated when the similarity factor Cv[i,j] or the similarity factor Ch[i,j] takes on a smaller value.

$$Cv[i,j] < Ch[i,j] \quad (4)$$

2 Color Difference Generation

2-1 Cr Plane Generation

Next, the generation of color difference information, i.e., the Cr plane, for an R pixel is explained. The color difference information Cr is calculated for an R pixel in the pre-conversion RGB image data. The expression used for this purpose is selected from different expressions, in correspondence to the value of the directional index HV[i,j] of the similarity having been determined as described above. Cr[i,j] is calculated by using expression (5) if HV[i,j]=1, by using expression (6) if HV[i,j]=−1 and by using expression (7) if HV[i,j]=0.

$$Cr[i,j]=R[i,j]-(G[i,j-1]+G[i,j+1])/2 \quad (5)$$

$$Cr[i,j]=R[i,j]-(G[i-1,j]+G[i+1,j])/2 \quad (6)$$

$$Cr[i,j]=R[i,j]-(G[i,j-1]+G[i,j+1]+G[i-1,j]+G[i+1,j])/4 \quad (7)$$

2-2 Cr Plane Interpolation

Next, the Cr plane is interpolated. By using the color difference information Cr having been generated for the R pixels, color difference information Cr is calculated through interpolation processing for each of the B pixels and the G pixels. The color difference information is calculated as expressed in (8) for a pixel corresponding to a B pixel, as expressed in (9) for a pixel corresponding to a G pixel adjacent to R pixels along the horizontal direction and as expressed in (10) for a pixel corresponding to a G pixel adjacent to R pixels along the vertical direction.

$$Cr[i,j]=(Cr[i-1,j-1]+Cr[i-1,j+1]+Cr[i+1,j-1]+Cr[i+1,j+1])/4 \quad (8)$$

$$Cr[i,j]=(Cr[i-1,j]+Cr[i+1,j])/2 \quad (9)$$

$$Cr[i,j]=(Cr[i,j-1]+Cr[i,j+1])/2 \quad (10)$$

2-3 Cb Plane Generation and Interpolation

Color difference information Cb, too, is obtained as explained above in reference to the color difference information Cr. The color difference information Cr and the color difference information Cb are obtained in correspondence to all the pixels constituting the pre-conversion RGB image data.

3 Temporary Color Difference Correction

A great quantity of color artifacts are present over the color difference planes obtained as described in "2. Color difference generation", and such color artifacts are likely to cause color moiré, or color mottling which tends to occur at a high ISO sensitivity level. While color artifacts should be adaptively eliminated without affecting the color structure, in advance, temporary elimination is executed to ensure that an artifact boundary is not erroneously recognized as a color boundary when the color gradient is classified as an index, as detailed in the next section. While two different methods are described below, a method other than these may be adopted.

Method 1 (Low-Pass Processing)

Expressions (101) and (102) and FIG. 8 relate to a 5×5 pixel separable filter.

Horizontal Low-Pass Filtering $$tmp\_Cr[i,j]=\{6*Cr[i,j]+4*(Cr[i-1,j]+Cr[i+1,j])+Cr[i-2,j]+Cr[i+2,j]\}/16 \quad (101)$$

Vertical Low-Pass Filtering $$TCr[i,j]=\{6*tmp\_Cr[i,j]+4*(tmp\_Cr[i,j-1]+tmp\_Cr[i,j+1])+tmp\_Cr[i,j-2]+tmp\_Cr[i,j+2]\}/16 \quad (102)$$

TCb[i,j], too, is calculated in a similar manner.

Method 2 (Median Processing)

Figure 9:
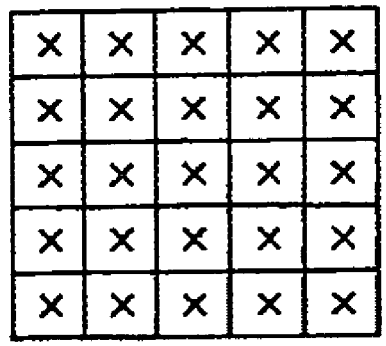
FIG. 9 presents an example of median processing executed over a 5×5 pixel range.

Expression (103) and FIG. 9 relate to median processing. In the median processing, all the pixel values within the 5×5 pixel range in FIG. 9 are sorted and the value at the center of the range (the median value) is selected.

$$TCr[i,j]=\text{Median}\{Cr[i+m,j+n]\} \quad m=0,\pm1,\pm2 \quad n=0,\pm1,\pm2 \quad (103)$$

4 Color Gradient Analysis

4-1 Calculation of Color Index

Next, color artifacts and actual colors present in the image are distinguished from each other by checking the color gradient so as to ensure that the color structure is kept intact. Since an actual color tends to better retain the color contrast even after the temporary color difference correction processing described in 3 above, compared to color artifacts, the actual color can be distinguished with a very high level of reliability based upon this statistically substantiated characteristic. In order to retain the color structure with as much accuracy as possible, a color index plane that will raise the color contrast between actual colors and lower the color contrast between color artifacts is generated. Generally speaking, color artifacts manifest readily between opposite colors and, for this reason, it is desirable to generate color indices with the primary colors. Namely, using the color difference signals Cr[i,j] and Cb[i,j] having been obtained as described above, a color index Cdiff[i,j] to be used to evaluate the color in units of individual pixels is obtained through conversion as expressed in (104) below.

$$Cdiff[i,j]=(|Cr[i,j]|+|Cb[i,j]|+|Cr[i,j]-Cb[i,j]|)/3 \quad (104)$$

The color index calculated by using all the color difference information representing all the possible combinations of the three primary colors, R, G and B, improves the level of protection with which the color structure is retained. The color index can be rewritten as below by substituting the definition of the color differences.

$$Cdiff=(|R-G|+|G-B|+|B-R|)/3 \quad (105)$$

4-2 Evaluation of Color Gradient

Figure 10:
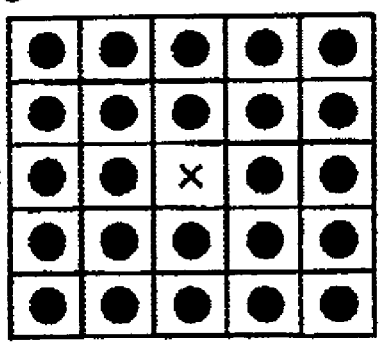
FIG. 10 illustrates how the color gradient is determined over the 5×5 pixel range matching the size of the temporary color difference correction filter.

Next, the color gradient Cgrad is determined as expressed in (106) below within a single color index plane containing color contrast information. The size of the differentiation filter used for the color gradient detection at this time is equal to the size of the temporary color difference correction filter and thus, all the ranges where there is any chance of destruction of the color structure can be checked. As a result, a high level of protection against destruction of the color structure is assured. FIG. 10 shows how the color gradient is determined over the 5×5 pixel range matching the size of the temporary color difference correction filter.

$$Cgrad[i, j] = \left( \sum_{\substack{m=\pm 1, \pm 2 \\ n=\pm 1, \pm 2}} |Cdiff[i+m, j+n] - Cdiff[i, j]| \right) / \quad (106)$$

$$\{(2*m\ max+1)(2*n\ max+1)-1\} = grad(Cdiff[i, j])$$

In expression 106 above, m max=2 and n max=2. It is not strictly necessary to calculate the differentials with regard to all the surrounding pixels and the differentiation may be executed for only some of the pixels. In such a case, the process of the arithmetic operation is expedited.

5 Adaptive Color Difference Correction

Next, a decision is made as to whether or not to execute color difference correction processing based upon the color gradient, as expressed in the following conditional expression (107). The initial Cr[i,j] is directly used over a color boundary where the color gradient is significant. The color gradient is indicated by a value that bears no relation to the luminance gradient.

if $Cgrad[i,j] \leq ThG\ Cr[i,j]=TCr[i,j]$ (107)

As described above, the color difference correction is executed as processing bearing no relation to the luminance (or brightness) information, i.e., the color difference correction is executed without using the luminance information. In other words, the color difference correction is executed only based upon the color difference information and the color gradient, completely unrelated to the luminance information. A very small value needs to be set as a threshold value ThG to ensure that areas where color mottling or color moiré has manifested are assigned as color difference correction target areas, regardless of whether they are chromatic areas or achromatic areas, while saving color structure portions as areas to be left intact. It should assume a value equal to or smaller than 5 in conjunction with 256 gradations. While the initial Cr[i,j] is directly used when the color gradient is greater than the threshold value ThG in the explanation given above, a filter with a narrower range than that of the temporary color difference correction filter may be applied instead.

G Plane Interpolation

Next, based upon the results of the direction judgment executed in step S12, the G value at each R/B position on the Bayer plane is calculated as expressed in (108), (109) or (110).

if $HV[i, j] = 1\ Gout[i, j] = (G[i, j-1] + G[i, j+1])/2 +$ (108)
$(2*Z[i, j] - Z[i, j-2] - Z[i, j+2])/4$ else if $HV[i, j] = -1\ Gout[i, j] = (G[i-1, j] + G[i+1, j])/2 +$ (109)
$(2*Z[i, j] - Z[i-2, j] - Z[i+2, j])/4$ else $Gout[i, j] =$ (110)
$(G[i, j-1] + G[i, j+1] + G[i-1, j] + G[i+1, j])/4 +$
$(4*Z[i, j] - Z[i, j-2] - Z[i, j+2] - Z[i-2, j] - Z[i+2, j])/8$ Z=R at an R position and Z=B at a B position. At a G position on the Bayer plane, "Gout[i,j]=Bayer signal" is directly used for substitution.

7 Colorimetric System Conversion (Color Space Conversion)

The image data are then converted to image data expressed in the RGB colorimetric system as indicated in expressions (111) and (112) below by using the three types of color information, i.e., the Cr and Cb planes having undergone the color artifact elimination as necessary and the G plane.

$Rout[i,j]=Cr[i,j]+Gout[i,j]$ (111)

$Bout[i,j]=Cb[i,j]+Gout[i,j]$ (112)

As described above, a high-quality interpolated image achieved by minimizing color artifacts, which are bound to result from color interpolation processing, is provided in the first embodiment. In particular, by adaptively reducing color artifact noise over chromatic image areas and achromatic image areas alike without destroying the image structure, a high-quality interpolated image is achieved. In other words, through the adaptive correction processing executed on the color difference components by using the color gradients as indices, a high-quality interpolated image, which does not contain a significant quantity of color artifacts, is provided.

Under normal circumstances, color moiré and color mottling attributable to a high ISO sensitivity level tend to occur as explained earlier over an image area where a great change manifests in the luminance component at the Nyquist frequency level in an image restored by interpolating spatially sampled color component data such as data obtained from pixels arranged in a Bayer array. Namely, a beat phenomenon caused by a slight interpolation prediction error among R, G and B over an area where the luminance changes at the Nyquist frequency level manifests as color moiré. In addition, a major cause of color mottling at a high ISO sensitivity level is color artifacts resulting from an interpolation prediction error at a level close to the Nyquist frequency pattern due to the erratic amplitudes of random noise that occur even in a flat image area where the luminance changes uniformly at the Nyquist frequency level.

Accordingly, by eliminating the color artifacts by ascertaining the color gradient based entirely upon the color difference component information alone without using the luminance component at all, as in the first embodiment, such color moiré and high ISO color mottling can be removed in a desirable manner, regardless of the structure of the luminance signals. In addition, color mottling manifesting at a high ISO sensitivity level can be removed effectively to clean up edge portions of monochromatic characters and the like where the color gradient does not change greatly, as well as a flat image area.

Second Embodiment

In the second embodiment, a color difference correction filter even more powerful than that in the first embodiment is used. The second embodiment differs from the first embodiment only in the filter used in "3. Temporary color difference correction" and the differentiation filter used in "4. Color gradient analysis". In coordination with the increase in the size of the filter used in the temporary color difference correction, a larger differentiation filter is used for the color gradient judgment so as to prevent destruction of the color structure.

Since the structure of the electronic camera 1 achieved in the second embodiment, the flowchart of the overall image data conversion processing executed by the image processing unit 11 and the block diagram showing the relationship among the various types of processing will be similar to those presented in FIGS. 1, 6 and 7, in reference to which the first embodiment has been explained, their explanation is omitted.

3 Temporary Color Difference Correction

Correction filters that may be used in the temporary color difference correction in the second embodiment include the following.

Method 1 (Low-Pass Processing)

Expressions (113) and (114) below represent an example of a 9×9 pixel separable filter.

Horizontal Low-Pass Filtering $$\text{tmp\_Cr}[i, j] = \{70 * Cr[i, j] + 56 * (Cr[i-1, j] + Cr[i+1, j]) + \\ 28 * (Cr[i-2, j] + Cr[i+2, j]) + \\ 8 * (Cr[i-3, j] + Cr[i+3, j]) + \\ (Cr[i-4, j] + Cr[i+4, j])\}/256 \quad (113)$$

Vertical Low-Pass Filtering $$TCr[i, j] = \\ \{70 * \text{tmp\_Cr}[i, j] + 56 * (\text{tmp\_Cr}[i, j-1] + \text{tmp\_Cr}[i, j+1]) + \\ 28 * (\text{tmp\_Cr}[i, j-2] + \text{tmp\_Cr}[i, j+2]) + \\ 8 * (\text{tmp\_Cr}[i, j-3] + \text{tmp\_Cr}[i, j+3]) + \\ \text{tmp\_Cr}[i, j-4] + \text{tmp\_Cr}[i, j+4]\}/256 \quad (114)$$

A similar processing concept applies to TCb[i,j].

Method 2 (Median Processing)

Expression (115) below represents an example of median processing.

$$TCr[i,j] = \text{Median}\{Cr[i+m, j+n]\} \; m=0,\pm1,\pm2,\pm3,\pm4 \\ n=m=0,\pm1,\pm2,\pm3,\pm4 \quad (115)$$

4 Color Gradient Analysis 4-1 Calculation of Color Index

The color index is calculated as in the first embodiment.

4-2 Evaluation of Color Gradient

Figure 11:
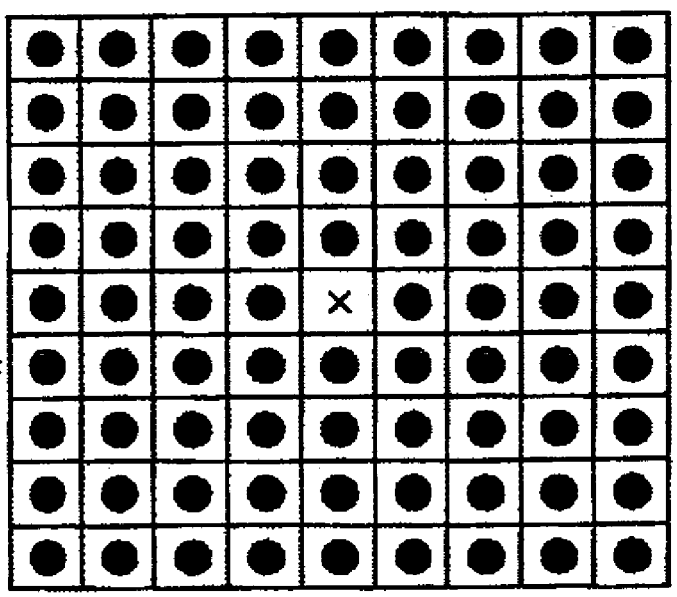
FIG. 11 illustrates how the color gradient is determined over the 9×9 pixel range matching the size of the temporary color difference correction filter used in a second embodiment.

The color gradient Cgrad is ascertained as indicated in (116) below. The size of the differentiation filter used at this time for color gradient detection matches the size of the temporary color difference correction filter so as to cover any range where the likelihood of destruction of the color structure exists in its entirety. As a result, the destruction of the color structure is effectively prevented. FIG. 11 shows how the color gradient is ascertained over the 9×9 pixel range matching the size of the temporary color difference correction filter.

$$Cgrad[i, j] = \left( \sum_{\substack{m=\pm1,\pm2,\pm3,\pm4 \\ n=\pm1,\pm2,\pm3,\pm4}} |Cdiff[i+m, j+n] - Cdiff[i, j]| \right) / \\ \{(2*m\max + 1)(2*n\max + 1) - 1\} = grad(Cdiff[i, j]) \quad (116)$$

In the expression presented above, m max=4 and n max=4. In this case, too, data may be culled through filtering as explained in reference to the first embodiment.

As described above, the second embodiment achieves advantages similar to those of the first embodiment, while using a more powerful color difference correction filter than that used in the first embodiment. More specifically, since the size of the color difference correction filter is increased to the 9×9 pixel size from the 5×5 pixel size used in the first embodiment, an advantage of being able to eliminate color artifacts (color moiré or color mottling) that occur over a longer cycle is achieved.

Third Embodiment

In the first and second embodiments, signals undergoing the color interpolation are processed. In the third embodiment, the present invention is adopted to process the interpolated data. For instance, JPEG data having been interpolated in the electronic camera and then output by the electronic camera may be processed in the third embodiment. Three examples of such applications are presented below. Since the structure adopted in the electronic camera 1 in the third embodiment is similar to that shown in FIG. 1 in reference to which the first embodiment has been explained, its explanation is omitted.

EXAMPLE 1

(1) Color Space Conversion

G, Cb, Cr data defined as below are obtained by converting interpolated RGB data.

$$Cr = R - G \quad (117)$$

$$Cb = B - G \quad (118)$$

The G-component remains unconverted.

(2) Adaptive Color Artifact Elimination Through Color Gradient Judgment

Processing identical to the processing executed in the first embodiment or the second embodiment, as described in "3 Temporary color difference correction" through "7 Colorimetric system conversion" is executed.

EXAMPLE 2

Figure 12:
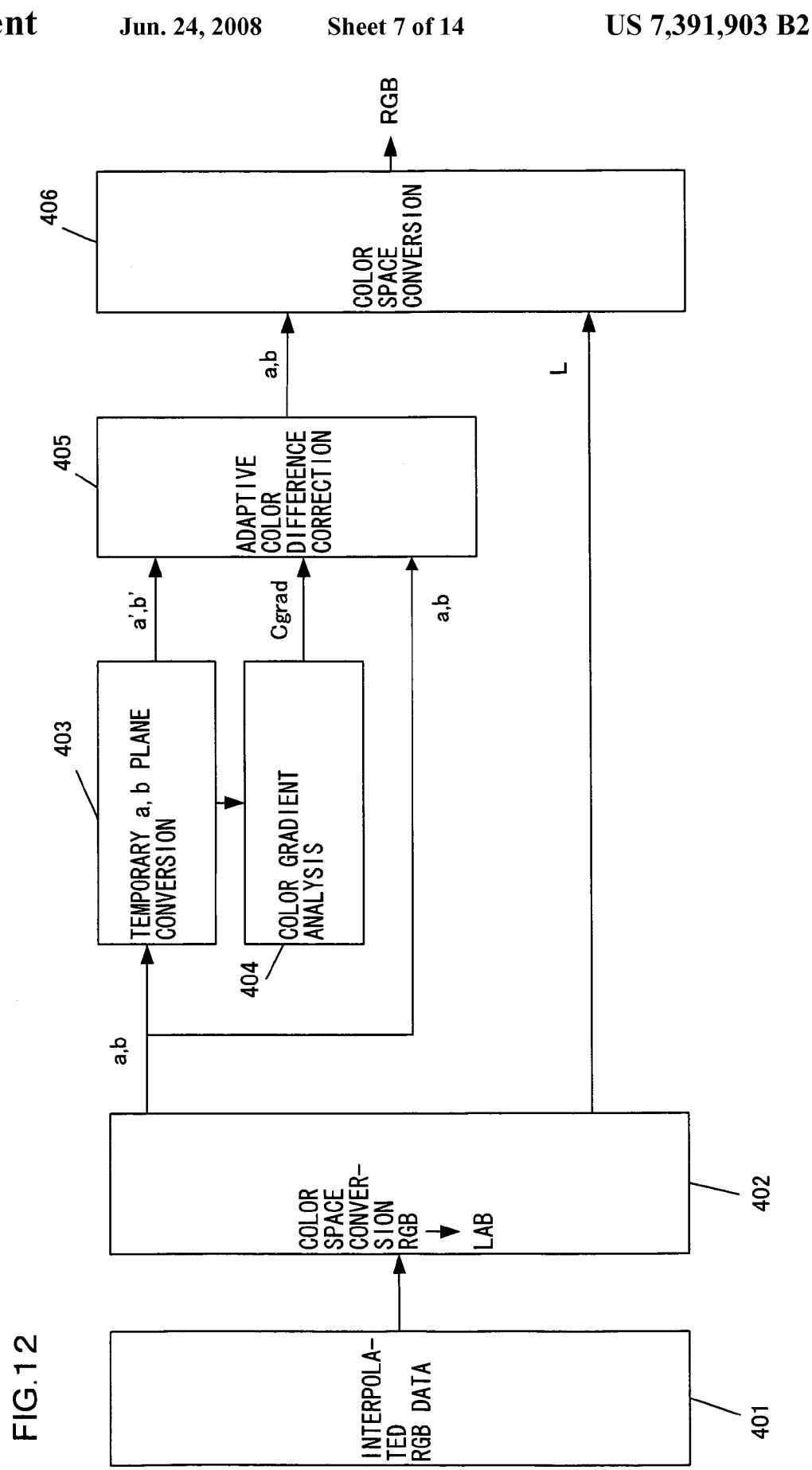
FIG. 12 is a block diagram provided to facilitate an explanation of the relationship among the various types of processing executed in example 2 of a third embodiment.

Under normal circumstances, interpolated data will have undergone color correction processing executed for purposes of image enhancement. In order to reduce the influence of the color correction processing in the data to undergo the color gradient judgment, Lab space conversion is executed on the data instead of the color space conversion in example 1. As an alternative to the Lab space conversion, Luv space conversion or the like may be executed. FIG. 12 is a block diagram showing the relationship among the various types of processing executed in example 2.

1) Color Space Conversion

The interpolated RGB data (401 in FIG. 12) are converted to Lab data (402 in FIG. 12).

2) Adaptive Color Artifact Elimination Through Color Gradient Judgment

The temporary color difference correction 304, the color gradient analysis 305, the adaptive color difference correction 306 and the colorimetric system conversion 308 in FIG. 7 showing the processing executed in the first embodiment respectively correspond to temporary ab plane correction 403, color gradient analysis 404, adaptive color difference correction 405 and color space conversion 406 in FIG. 12 showing the processing executed in this embodiment. The processing executed with regard to Cb and Cr in the first embodiment or the second embodiment as described in "3 Temporary color difference correction" through "7 Colorimetric system conversion" is executed for a and b, instead.

The aspect of the processing that needs to be modified in conjunction with a and b is defined below.

4 Color Gradient Analysis (404 in FIG. 12)

A color index Cdiff is calculated as expressed in (119) or (120) below.

$$Cdiff[i, j] = \sqrt{(a[i, j])^2 + (b[i, j])^2 + (a[i, j] - b[i, j])^2} \quad (119)$$

$$Cdiff[i, j] = (|a[i, j]| + |b[i, j]| + |a[i, j] - b[i, j]|)/3 \quad (120)$$

EXAMPLE 3

While the color space used to ascertain the color gradient and the color space undergoing the color difference correction processing match in example 2, those color spaces do not need to match, either. The color space undergoing the color difference correction processing may be, for instance, an ab plane in the Lab space or an IQ plane in the Y IQ space. The color gradient may be determined by first executing the color difference correction on the ab plane or the IQ plane and then converting the color space to, for instance, an HSV space or an LCH space. The color gradient can be determined by checking changes occurring in chromaticity components, i.e., non-luminance components, in the converted data, as indicated in expression (121) or expression (122) below. H and S in the HSV space and C and H in the LCH space constitute chromaticity components (information). Simply put, the term "chromaticity" refers to qualitative characteristics of color that do not include luminance. The color difference (chrominance) is a concept that is part of the conceptual scope of chromaticity.

when converted to HSV space data;

$$Cgrad[i,j]=|grad(S[i,j])|+|grad(H[i,j])| \quad (121)$$

when converted to LCH space data;

$$Cgrad[i,j]=|grad(C[i,j])|+|grad(H[i,j])| \quad (122)$$

It is to be noted that "grad" is an operator having been defined in the description of the first embodiment and the second embodiment.

As described above, the data are converted to data in a color space that contains chromaticity components and the color gradient is determined based upon the chromaticity components in the third embodiment. Then, based upon the color gradient thus determined, adaptive color difference correction is executed as in the first embodiment to achieve advantages similar to those of the first embodiment.

Fourth Embodiment

In the fourth embodiment, a specific luminance component generation method is selected in correspondence to the results of the color gradient judgment. Since the electronic camera 1 achieved in the fourth embodiment adopts a structure similar to that shown in FIG. 1 in reference to which the first embodiment has been explained, its explanation is omitted.

The technologies known in the related art through which a color image captured at an image sensor having color filters disposed in a Bayer array is interpolated include that disclosed in U.S. Pat. No. 5,382,976. In the method disclosed in this publication, the G plane is interpolated by checking the directionality of the Bayer plane and the R plane and the B plain are interpolated so as to resemble the G plane while superimposing the high frequency component present in the G plane over the R and B planes. The processing executed to interpolate the R and B planes is equivalent to first converting the data to data in spaces of color difference planes R–G and B–G, then incorporating the data on the color difference planes, then adding the G plane to the interpolated data, and then converting the data back to R and B data. However, since the G plane interpolation is executed simply by using the average value of the G-component data near the interpolation target pixel, an uneven structure in the image cannot be accurately predicted, which leads to a problem of diagonal jaggies occurring along a diagonal line.

This problem is addressed in U.S. Pat. No. 5,629,734 that discloses a method in which the G-component data are also interpolated by incorporating the R and B planes to the G plane so as to resemble them. The algorithm used in conjunction with this method is logically supported on the premise that the color differences R–G and B–G always remain constant and that R, G and B data all manifest similar behavioral characteristics.

The problem is also addressed in the method invented by the inventor of the present invention, which is disclosed in International Publication No. 02/071761. In this method, measures are taken against diagonal jaggies by taking in information related to unevenness of the central pixel when directly converting the luminance component to a luminance component in another color space resulting from weighted composition of R, G and B, instead of interpolating the luminance component in the plane.

However, the measures taken as disclosed in U.S. Pat. No. 5,629,734 are bound to lead to a problem of disruption in the restored image over color boundary areas where the premise that the color differences are constant cannot be supported. Namely, the correction term corresponding to the R-component or the B-component, which is used to correct the G average value among nearby pixels when interpolating G-component data, actually becomes a destructive factor and, the resulting over-correction causes black or white spots (overshoots) all over the color boundary areas.

Through the method disclosed in International Publication No. 02/071761, the problem of diagonal jaggies can be addressed far more successfully compared to the method disclosed in U.S. Pat. No. 5,629,734, without inducing any overshoots in color boundary areas. However, vertical or horizontal streaks (color boundary jaggies) may occur very occasionally in a boundary area where a specific combination of colors is present.

In the fourth embodiment, an image processing method for generating a high-definition, high-quality color image by taking optimal measures against diagonal jaggies while, at the same time, addressing the problems likely to occur over color boundary areas as described above.

Figure 13:
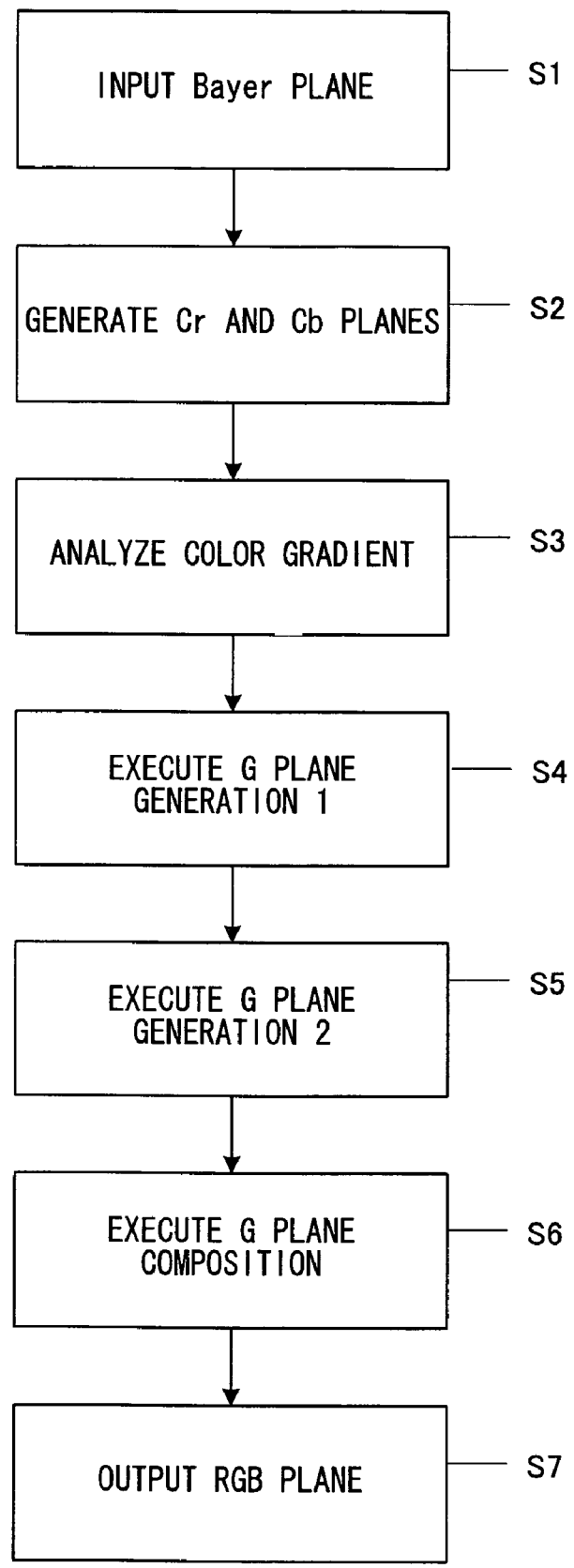
FIG. 13 presents a schematic flowchart of the image data conversion processing executed by the image processing unit in a fourth embodiment.
Figure 14:
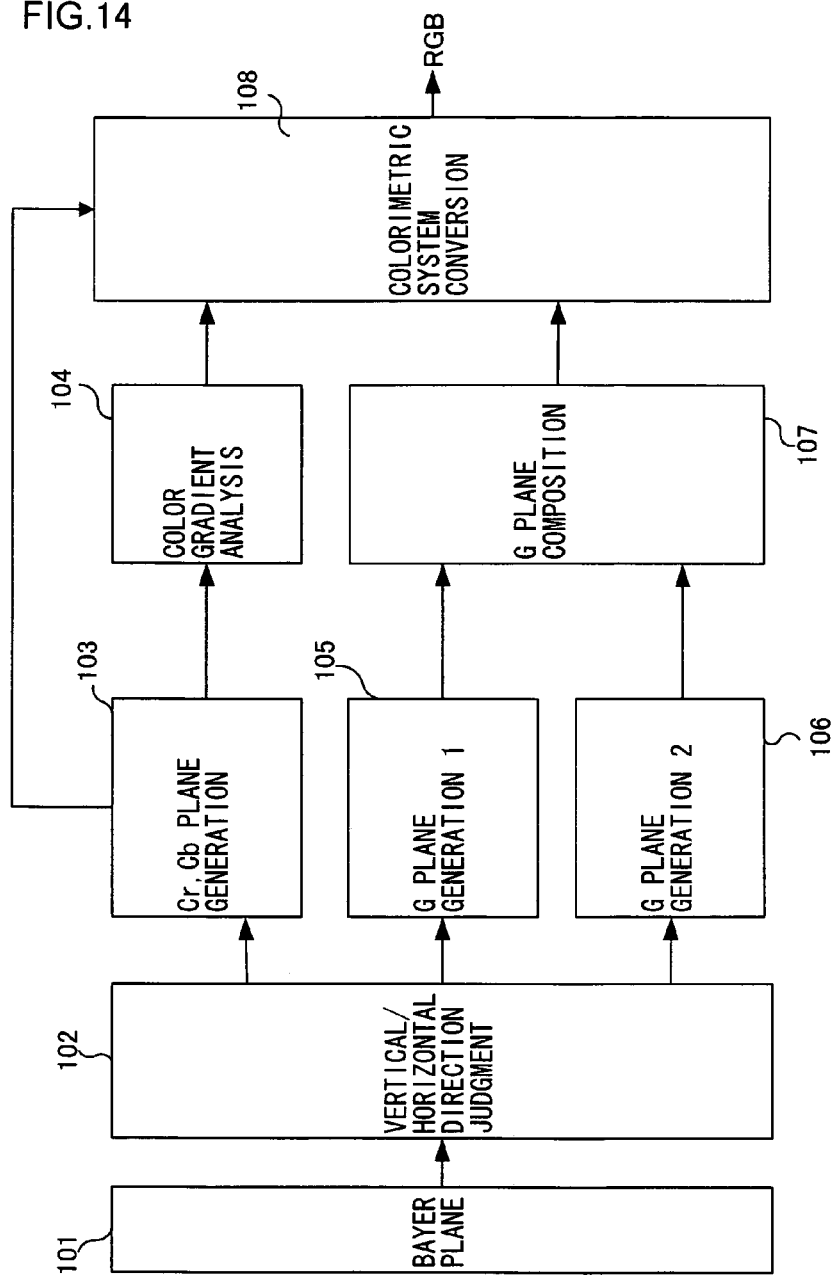
FIG. 14 is a block diagram provided to facilitate an explanation of the relationship among the various types of processing executed in the fourth embodiment.

FIG. 13 presents a flowchart of the overall image data conversion processing executed by the image processing unit 11. FIG. 14 is a block diagram provided to facilitate an explanation of the relationship among the various types of processing. The image data conversion processing executed by the image processing unit 11 is summarized in reference to FIGS. 13 and 14.

In step S1, the Bayer plane (101 in FIG. 14), i.e., the pre-conversion RGB image data, is input. In step S2, a Cr plane and a Cb plane are generated, i.e., color difference information Cr and Cb are generated in correspondence to each pixel (103 in FIG. 14) by using the color information corresponding to the individual color components contained in the pre-conversion RGB image data. At this time, a vertical/horizontal direction judgment is executed (102 in FIG. 14) by calculating similarity factors, and the color difference information Cr and Cb is generated based upon the results of the vertical/horizontal direction judgment.

In step S3, a color gradient analysis is executed (104 in FIG. 14) by using the color difference information Cr and Cb. In the color gradient analysis, a color index to be used to evaluate the subject pixel to determine whether the subject pixel is an achromatic pixel or a chromatic pixel and the level of chromaticity of the pixel if the pixel is determined to be a chromatic pixel is first calculated. Such a color index is determined for all the pixels and a color index plane is generated. Then, each pixel is analyzed based upon the color index of the subject pixel and the color indices of the surrounding pixels to determine the color gradient at the pixel and whether or not a color boundary is present. The term "color gradient" refers to the extent of color change.

In step S4, G plane generation 1 is executed (105 in FIG. 14). Namely, color information corresponding to the G color component is generated through interpolation processing for all the pixels. The interpolation method adopted for G plane generation 1 enables diagonal resolution. In other words, the interpolation method does not induce diagonal jaggies. Next, in step S5, G plane generation 2 is executed (106 in FIG. 14). As in the G plane generation 1, color information corresponding to the G color component is generated through interpolation processing in correspondence to all the pixels. While the interpolation method adopted for the G plane generation 2 may allow diagonal jaggies to occur, it does not allow any problems to manifest in color boundary areas.

In step S6, the results of the interpolation executed in G plane generation 1 in step S4 and the interpolation executed in the G plane generation 2 in step S5 are combined (107 in FIG. 14) based upon the results of the color gradient analysis executed in step S3. For instance, the interpolation results from G plane generation 1 are used if, for instance, the color gradient is shallow, i.e., if the color change is flat, whereas the interpolation results from the G plane generation 2 are used if the color gradient is steep, i.e., over a color boundary area. Alternatively, the interpolation results from G plane generation 1 and the interpolation results from the G plane generation 2, weighted with coefficients corresponding to the color gradient, may be added together.

In step S7, the image data are converted to image data expressed in the RGB colorimetric system (108 in FIG. 14) based upon the Cr plane and the Cb plane from step S2 and the G plane having been generated in step S6, and the image data resulting from the conversion are output. The image data thus output undergo various types of image processing and are stored into memory or the like.

It is to be noted that the number of pixels constituting the pre-conversion RGB image data and the number of pixels constituting the post-conversion image data are equal to each other and the positions of the pre-conversion pixels and the post-conversion pixels have a one-to-one correspondence on a two-dimensional plane. The image data conversion processing for all the pixels described above is achieved by repeatedly executing image data conversion processing in a target local areas. Accordingly, the following explanation is given by quoting relational expressions indicating relationships locally applicable in individual target areas. Various aspects of the processing are explained in detail below.

Since the processing executed up to the steps corresponding to "1-2-3 Cb plane generation and interpolation" below is identical to the processing executed in the first embodiment, its explanation is omitted.

1 Cr and Cb Color Difference Plane Generation 1-1 Direction Judgment 1-1-1 Calculation of Similarity Factors 1-1-2 Similarity Judgment 1-2 Color Difference Generation 1-2-1 Cr Plane Generation 1-2-2 Cr Plane Interpolation 1-2-3 Cb Plane Generation and Interpolation 1-2-4 Color Difference Correction Prior to the color evaluation, the color difference information Cr and Cb is corrected. The color difference information is corrected so as to accurately evaluate the color by eliminating color artifacts manifesting in the Cr color difference plane and the Cb color difference plane having been obtained as explained earlier. While the color difference correction may be executed by using a color difference median filter, a low-pass filter which functions as indicated in expression (11) below and shown in FIG. 15 is used in the fourth embodiment. Through this processing, color artifacts can be eliminated quickly. It is to be noted that color artifacts may be eliminated by adopting another method.

$$Cr[i, j] = \{4*Cr[i, j] + \\ 2*(Cr[i-2, j] + Cr[i+2, j] + Cr[i, j-2] + Cr[i, j+2]) + \\ 1*(Cr[i-2, j-2] + Cr[i+2, j-2] + \\ Cr[i-2, j+2] + Cr[i+2, j+2])\}/16 \quad (11)$$

Cb[i,j] is calculated in a similar manner.

2 Color Gradient Analysis 2-1 Calculation of Color Index

Using the color difference information Cr[i,j] and Cb[i,j] having been obtained as described above, a color index Cdiff [i,j] to be used to evaluate the color in units of individual pixels is obtained as in expressed in (12) below.

$$Cdiff[i,j]=(|Cr[i,j]|+|Cb[i,j]|+|Cr[i,j]-Cb[i,j]|)/3 \quad (12)$$

The value calculated as the color index indicates whether the subject pixel is an achromatic pixel or a chromatic pixel and also the level of chromaticity if the subject pixel is determined to be a chromatic pixel. In order to ensure that the color index indicates a highly accurate value, it is calculated by using the color difference information representing all possible combinations of the three primary colors R, G and B. Expression (12) can be rewritten to expression (13) below by substituting the definition of the color differences. The use of such a color index in the embodiment makes it possible to detect all types of color boundaries with equal effectiveness.

$$Cdiff=(|R-G|+|G-B|+|B-R|)/3 \quad (13)$$

2-2 Evaluation of Color Gradient

Once the color expected to appear in a restored Bayer image is accurately determined, a color gradient is determined within the color index plane so as to identify color boundary areas where problems tend to occur readily in the related art. The color gradient grad_Cdiff[i,j] at the conversion target pixel [i,j] can be calculated as indicated in expression (14) below.

$$\begin{aligned}
\text{grad\_Cdiff}[i, j] = \quad & \quad (14)\\
(|Cdiff[i-1, j] - Cdiff[i, j]| + |Cdiff[i+1, j] - Cdiff[i, j]| + \\
|Cdiff[i, j-1] - Cdiff[i, j]| + |Cdiff[i, j+1] - \\
Cdiff[i, j]| + |Cdiff[i-1, j-1] - Cdiff[i, j]| + \\
Cdiff[i+1, j+1] - Cdiff[i, j]| + |Cdiff[i-1, j+1] - \\
Cdiff[i, j]| + |Cdiff[i+1, j-1] - Cdiff[i, j]|)/8
\end{aligned}$$

An isotropic first-order differentiation filter that ascertains the differences relative to all the adjacent pixels is used in the color gradient calculation expressed in (14) so as to detect color boundary areas that may be present along all directions at once. The differentiation is executed isotropically along a plurality of directions in order to detect edges present along all directions. It is to be noted that a quadratic (second-order) differentiation filter that calculates the differences between differences may be used instead. Through first-order differentiation, a leading or trailing edge is detected, whereas a peak or trough is detected through quadratic differentiation.

3 G Plane Generation 1

Based upon the directional index HV[i,j] determined through the direction judgment explained earlier, color information G[i,j] corresponding to the G color component is obtained for each of the R pixels [i,j] and the B pixels [i,j] in the pre-conversion RGB image data. Namely, the G-component color information missing at an R pixel or a B pixel is obtained through interpolation processing. The interpolation method adopted in G plane generation 1 allows diagonal resolution, i.e., prevents occurrence of diagonal jaggies. However, it may induce problems in color boundary areas. g1 represents the G interpolation value calculated through this interpolation method.

When directional index HV[i,j]=1, i.e., when it is judged that pronounced similarity manifests along the vertical direction, g1[i,j] is calculated as indicated in expression (15). When directional index HV[i,j]=−1, i.e., when it is judged that pronounced similarity manifests along the horizontal direction, g1[i,j] is calculated as indicated in expression (16). When directional index HV[i,j]=0, i.e., when it is judged that the vertical/horizontal similarity is not clear, g1[i,j] is calculated as indicated in expression (17).

$$g1[i,j]=(G[i,j-1]+G[i,j+1])/2+(2*Z[i,j]-Z[i,j-2]-Z[i,j+2])/4 \quad (15)$$

$$g1[i,j]=(G[i-1,j]+G[i+1,j])/2+(2*Z[i,j]-Z[i-2,j]-Z[i+2,j])/4 \quad (16)$$

$$g1[i,j]=(G[i,j-1]+G[i,j+1]+G[i-1,j]+G[i+1,j])/4+ \\ (4*Z[i,j]-Z[i,j-2]-Z[i,j+2]-Z[i-2,j]-Z[i+2,j])/8 \quad (17)$$

It is to be noted that Z=R when the target pixel is an R pixel and Z=B when the target pixel is a B pixel.

The value indicated at a G pixel [i,j] in the pre-conversion RGB image data is directly used as g1[i,j].

4 G Plane Generation 2

As in the G plane generation 1, based upon the directional index HV[i,j] determined through the direction judgment explained earlier, color information G[i,j] corresponding to the G color component is obtained for each of the R pixels [i,j] and the B pixels [i,j] in the pre-conversion RGB image data. Namely, the G-component color information missing at an R pixel or a B pixel is obtained through interpolation processing. While the interpolation method adopted in conjunction with the G plane generation 2 may induce diagonal jaggies, it is free of any problems that may otherwise occur in color boundary areas. g2 represents the G interpolation value calculated through this interpolation method.

When directional index HV[i,j]=1, i.e., when it is judged that pronounced similarity manifests along the vertical direction, g2[i,j] is calculated as indicated in expression (18). When directional index HV[i,j]=−1, i.e., when it is judged that pronounced similarity manifests along the horizontal direction, g2[i,j] is calculated as indicated in expression (19). When directional index HV[i,j]=0, i.e., when it is judged that the vertical/horizontal similarity is not clear, g2[i,j] is calculated as indicated in expression (20).

$$g2[i,j]=(G[i,j-1]+G[i,j+1])/2 \quad (18)$$

$$g2[i,j]=(G[i-1,j]+G[i+1,j])/2 \quad (19)$$

$$g2[i,j]=(G[i,j-1]+G[i,j+1]+G[i-1,j]+G[i+1,j])/4 \quad (20)$$

The value indicated at the G pixel [i,j] in the pre-conversion RGB image data is directly used as g2[i,j].

As an alternative to the arithmetic operation executed as indicated in expressions (18) through (20), an arithmetic operation may be executed as indicated in (21) through (23) with which the occurrence of diagonal jaggies can be somewhat suppressed. Since information related to unevenness is obtained by making predictions with the G color component itself during G color component interpolation, no problem occurs in color boundary areas, as has been explained in reference to expressions (18) through (20). When directional index HV[i,j]=1, i.e., when it is judged that pronounced similarity manifests along the vertical direction, g2[i,j] is calculated as indicated in expression (21). When directional index HV[i,j]=−1, i.e., when it is judged that pronounced similarity manifests along the horizontal direction, g2[i,j] is calculated as indicated in expression (22). When directional index HV[i,j]=0, i.e., when it is judged that the vertical/horizontal similarity is not clear, g2[i,j] is calculated as indicated in expression (23).

$$\begin{aligned}
g2[i, j] = &(G[i, j-1] + G[i, j+1])/2 + \\
&(2*G[i-1, j] - G[i-1, j-2] - G[i-1, j+2])/8 + \\
&(2*G[i+1, j] - G[i+1, j-2] - G[i+1, j+2])/8
\end{aligned} \quad (21)$$

$$\begin{aligned}
g2[i, j] = &(G[i-1, j] + G[i+1, j])/2 + \\
&(2*G[i, j-1] - G[i-2, j-1] - G[i+2, j-1])/8 + \\
&(2*G[i, j+1] - G[i-2, j+1] - G[i+2, j+1])/8
\end{aligned} \quad (22)$$

$$\begin{aligned}
g2[i, j] = &(G[i, j-1] + G[1, j+1] + G[i-1, j] + G[i+1, j])/4 + \\
&(2*G[i-1, j] - G[i-1, j-2] - G[i-1, j+2])/16 + \\
&(2*G[i+1, j] - G[i+1, j-2] - G[i+1, j+2])/16 + \\
&(2*G[i, j-1] - G[i-2, j-1] - G[i+2, j-1])/16 + \\
&(2*G[i, j+1] - G[i-2, j+1] - G[i+2, j+1])/16
\end{aligned} \quad (23)$$

5 G Plane Composition 5-1 Determining Weighting Ratio

Of the G interpolation values obtained through the two different methods for G plane generation explained above, the G interpolation value g1 that effectively prevents diagonal jaggies obtained through the G plane generation 1 is normally used and the G interpolation value g2 obtained through the G plane generation 2 is used in a problematic color boundary area. The color gradient described earlier is used as the weighting ratio based upon which the G interpolation values are switched. With 1-λ representing the weighting ratio of g1 and λ representing the weighting ratio of g1 at a given pixel [i,j], the value of λ can be determined as indicated in expressions (24) through (26) below.

$$\text{if grad\_Cdiff}[i,j] \leq th1 \; \lambda[i,j]=0 \quad (24)$$

$$\text{else if grad\_Cdiff}[i,j] \leq th2 \; \lambda[i,j]=\text{grad\_Cdiff}[i,j]/th2 \quad (25)$$

$$\text{else } \lambda[i,j]=1 \quad (26)$$

Figure 16:
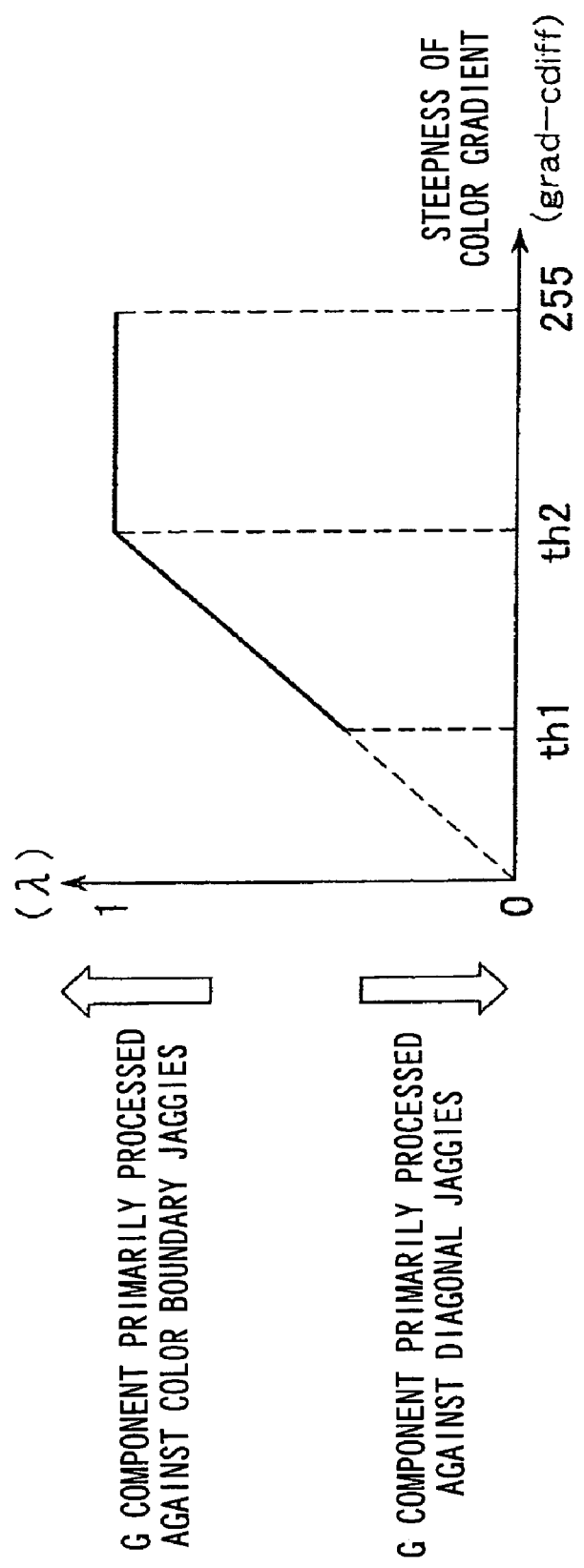
FIG. 16 shows the relationship between the color gradient and the G-component composition rate.

This operation is schematically illustrated in FIG. 16. Threshold values th1 and th2 should assume values such as th1=0~4 and th2=6~10 when the data are provided as 256-gradation data. Namely, g1 is used in the range where the color gradient is small, g2 is used over the range in which the color gradient is large and the G interpolation value is obtained through weighted composition by using the steepness of the color gradient itself as an index over the intermediate range. In some cases, the identical value may be set for th1 and th2, and either g1 or g2 may be simply selected as the G interpolation value without designating any intermediate range.

5-2 Weighted Composition Processing

Using the weighting ratio λ described above, the two types of G interpolation values g1 and g2 are combined through weighted composition, as indicated in expression (27).

$$G[i,j]=(1-\lambda[i,j])*g1[i,j]+\lambda[i,j]*g2[i,j] \quad (27)$$

6 Colorimetric System Conversion

The image data are then converted to RGB colorimetric system data as indicated in expressions (28) and (29) by using the three types of color information, i.e., the Cr and Cb planes obtained as indicated in expressions (8) through (10) or the Cr and Cb planes having undergone desired color difference correction as indicated in (11) and the G plane obtained as indicated in expression (27).

$$R[i,j]=Cr[i,j]+G[i,j] \quad (28)$$

$$B[i,j]=Cb[i,j]+G[i,j] \quad (29)$$

By adjusting the interpolation method in correspondence to the intensity of the color gradient, image generation and restoration, which minimizes both diagonal jaggies and the extent of disruption over color boundary areas, is enabled. In particular, the occurrence of black or white spots (overshoots) in color boundary areas, which is likely to manifest in the related art, can be minimized by adopting the fourth embodiment. As a result, an interpolated image of high quality, which does not contain any significant false structure, can be provided.

Fifth Embodiment

In the fourth embodiment, G plane generation 1 is executed by adopting the standard concept of interpolation processing. In reference to the fifth embodiment, an example of G plane generation 1 executed by adopting another method different from that used in the fourth embodiment is explained. The basic method adopted in G plane generation 1 executed in the fifth embodiment is disclosed in International Publication No. 02/071761.

Since the structure of the electronic camera 1 achieved in the fifth embodiment is similar to that shown in FIG. 1, which also applies to the fourth embodiment, its explanation is omitted. In addition, the flowchart of the overall image data conversion processing executed by the image processing unit 11 will only differ from the flowchart presented in FIG. 13 corresponding to the fourth embodiment in the color gradient analysis executed in step S3 and G plane generation 1 executed in step S4. For this reason, no flowchart is provided in correspondence to the fifth embodiment, and it is explained in reference to FIG. 13.

Figure 17:
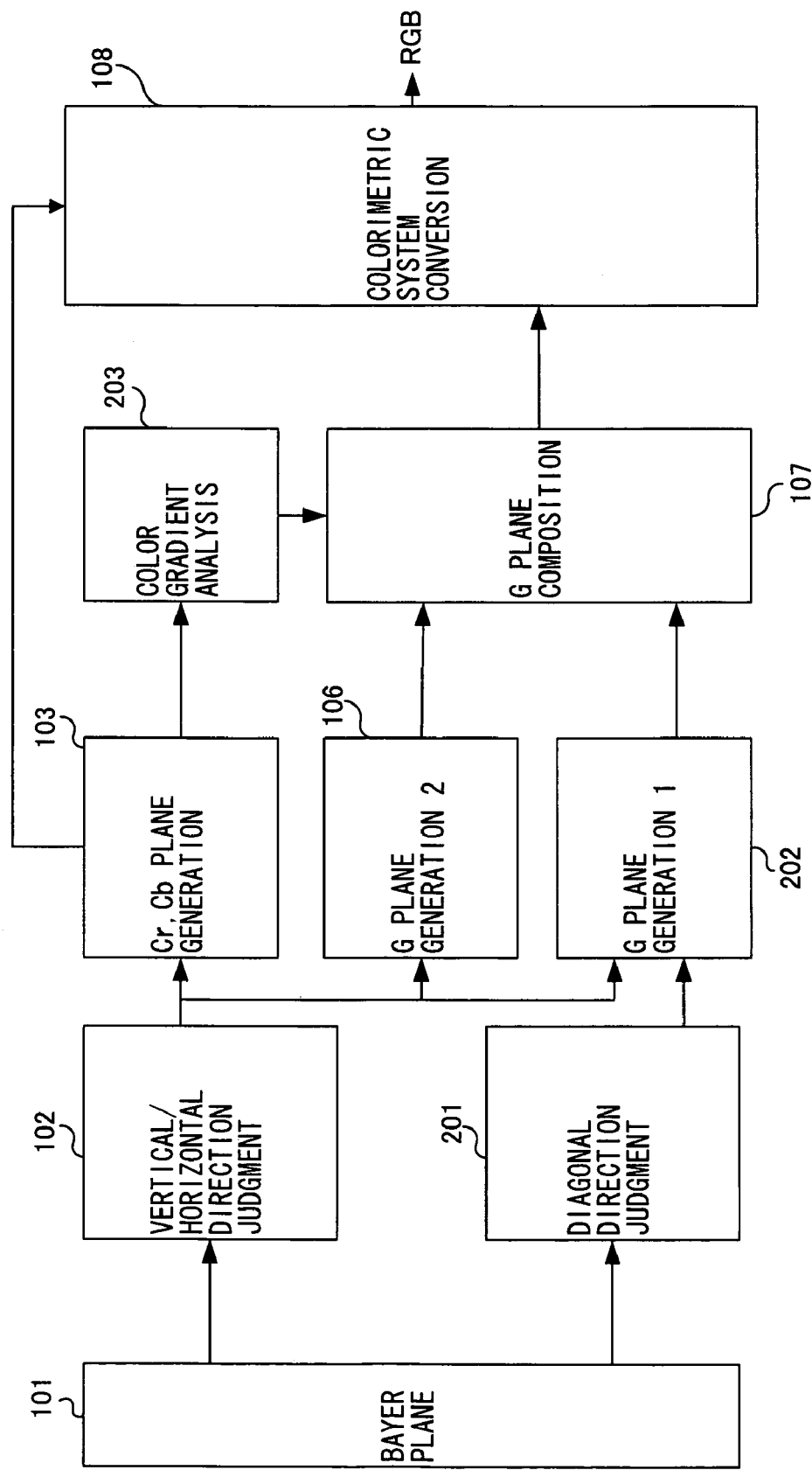
FIG. 17 is a block diagram provided to facilitate an explanation of the relationship among the various types of processing executed in a fifth embodiment.

FIG. 17 is a block diagram provided to facilitate an explanation of the relationship among the various types of processing executed in the fifth embodiment. It differs from the block diagram in FIG. 14 corresponding to the fourth embodiment in that it additionally includes diagonal direction judgment 201 and in that G plane generation 1 (202) is executed based upon the results of the vertical/horizontal direction judgment 102 and the diagonal direction judgment 201. In addition, the contents of the color gradient analysis 203 are different from those of the color gradient analysis 104 executed in the fourth embodiment. The following is an explanation of the fifth embodiment, which focuses on the color gradient analysis 203 (step S3) and G plane generation 1 (202) (step S4).

1 Cr and Cb Color Difference Plane Generation

The Cr and Cb color difference planes are generated as in the fourth embodiment. As in the fourth embodiment, the vertical/horizontal direction judgment is executed to judge the type of similarity for the Cr and Cb color difference plane generation.

2 Color Gradient Analysis 2-1 Calculation of Color Index

A color index Cdiff[i,j] to be used to evaluate the color corresponding to each pixel is determined by using the color difference information Cr[i,j] and Cb[i,j] obtained through the Cr and Cb color difference plane generation. While it is necessary to detect all the color boundaries where overshoots may occur in the fourth embodiment, the objective of the fifth embodiment is to extract an area where vertical or horizontal streaks are induced during Y plane generation to be detailed later and process such an area by adopting a different method.

Since G plane generation 1 is basically executed through the method disclosed in International Publication No. 02/071761 in the fifth embodiment, measures against diagonal jaggies can be taken with far less likelihood of problems occurring in color boundary areas compared to the method disclosed in U.S. Pat. No. 5,629,734. However, even when the G plane is generated through the particular method of G plane generation 1 adopted in the fifth embodiment, vertical or horizontal streaks (color boundary jaggies) may occur in a boundary area where a specific combination of colors is present. Such vertical or horizontal streaks (color boundary jaggies) tend to occur in a color boundary where red and blue are present together, a color boundary where green and orange are present together, a color boundary where pink and pale blue are present together, a color boundary where white and yellow are present together and the like. It has been learned that the likelihood of such vertical or horizontal streaks increases when opposite colors are present in a color boundary. This is assumed to be attributable to a moiré phenomenon occurring locally in the post-composition luminance component, due to interference of the different types of color information corresponding to the R, G and B color components in an area where a specific combination of colors is present although the luminance plane obtained through composition at a specific RGB ratio by taking into consideration the directionality normally has smooth continuity over regular color boundary areas and diagonal line structures.

Accordingly, since color boundary jaggies tend to occur in a color boundary areas where opposite colors are present and do not occur in a normal color boundaries, the contrast in the identification target area is increased by using the color difference between opposite colors as the color index so as to increase the performance capability with which a color boundary area containing opposite colors is detected. Namely, a color index Cdiff[i,j] is calculated as indicated in expression (30).

$$\text{Cdiff}[i,j]=(|Cr[i,j]-Cb[i,j]/2|+|Cb[i,j]-Cr[i,j]/2|+|Cr[i,j]/2+Cb[i,j]/2|)/3 \quad (30)$$

Expression (31) is obtained by expanding the color difference terms in expression (30) defining the color index. R (red) and Cy (cyan), G (green) and Mg (magenta), and B (blue) and Ye (yellow) are opposite colors (complementary colors).

$$\text{Cdiff}=(|R-(G+B)/2|+|G-(B+R)/2|+|B-(R+G)/2|)/3= \\ (|R-Cy|+|G-Mg|+|B-Ye|)/3 \quad (31)$$

2-2 Evaluation of Color Gradient

The color gradient is evaluated as in the fourth embodiment.

3. G Plane Generation 1

G component information is generated by adopting a method which is different from the method used in the fourth embodiment and enables diagonal resolution, i.e., to prevent diagonal jaggies. In this embodiment, instead of executing G interpolation, a luminance component and color difference components are first generated in a different colorimetric system and then the data are converted to RGB component data based upon the method disclosed in International Publication No. 02/071761.

3-1 Diagonal Direction Judgment 3-1-1 Calculation of Similarity Factors

A decision is made with regard to similarity manifesting along a diagonal direction at each R pixel or B pixel in the pre-conversion RGB image data by using pixel information available in a local area containing the conversion target pixel. The diagonal direction is either a diagonal direction running at a 45° angle or a diagonal direction running at a 135° angle. The diagonal 45° direction is indicated as [HV,DN]=[0,1] and the diagonal 135° direction is indicated as [HV,DN]=[0,−1] in FIG. 18. A further explanation is to be given in reference to FIG. 18. A similarity factor C45[i,j] indicating the similarity manifesting along the diagonal 45° direction is calculated as indicated in expression (32), whereas a similarity factor C135[i,j] indicating the similarity manifesting along the diagonal 135° direction is calculated as indicated in (33).

$$C45[i,j]=\{(|G[i,j-1]-G[i-1,j]|+|G[i+1,j]-G[i,j+1]|)/ \\ 2+(|Z[i+1,j-1]-Z[i,j]|+|Z[i-1,j+1]-Z[i,j]|)/2\}/2 \quad (32)$$

$$C135[i,j]=\{(|G[i,j-1]-G[i+1,j]|+|G[i-1,j]-G[i,j+1]|)/ \\ 2+(|Z[i-1,j-1]-Z[i,j]|+|Z[i+1,j+1]-Z[i,j]|)/2\}/2 \quad (33)$$

3-1-2 Similarity Judgment

Next, a similarity judgment is executed. Based upon C45[i,j] and C135[i,j] having been calculated as described above, the direction of similarity manifesting with regard to the conversion target pixel is judged. In this embodiment, a decision is made as to whether pronounced similarity manifests along the diagonal 45° direction or the diagonal 135° direction, or if pronounced similarity cannot be discerned along the diagonal 45° direction or the diagonal 135° direction. More specifically, if the condition expressed in (34) is satisfied, it is determined that the direction of pronounced similarity, i.e., either the diagonal 45° direction or the diagonal 135° direction, is not clear, and 0 is set for a directional index DN[i,j]. Th2 is a specific threshold value assuming a value similar to the value assumed for Th1 used in the vertical/horizontal direction judgment. It should take on a value of approximately 10 in correspondence to the 256 gradations. If the difference between the similarity factors calculated for the diagonal 45° direction and the diagonal 135° direction is equal to or less than the threshold value Th2, it cannot be determined whether pronounced similarity manifests along the diagonal 45° direction or the diagonal 135° direction.

$$|C45[i,j]-C135[i,j]|\leq Th2 \quad (34)$$

If the condition expressed in (34) is not satisfied, i.e., if it is decided that more pronounced similarity manifests either along the diagonal 45° direction or the diagonal 135° direction, a decision is made as to whether or not the condition expressed in (35) is satisfied. If the condition (35) is satisfied, it is determined that more pronounced similarity manifests along the diagonal 45° direction and 1 is set for the directional index DN[i,j]. If the condition (35) is not satisfied, it is determined that more pronounced similarity manifests along the diagonal 135° direction and accordingly, −1 is set for the directional index DN[i,j]. It is to be noted that a higher level of similarity is indicated when the similarity factor C45[i,j] or the similarity factor C135[i,j] takes on a smaller value.

$$C45[i,j]<C135[i,j] \quad (35)$$

3-2 Luminance Y Plane Generation 3-2-1 Instead of generating G plane information, as in the fourth embodiment, luminance information Y is calculated in the fifth embodiment to generate a luminance Y plane through direct weighted addition of Bayer plane information. Namely, the luminance information Y is directly generated by using the color information corresponding to the individual color components in the pre-conversion RGB image data yet to undergo interpolation processing. A[x,y] represents color information corresponding to a given color component in the pre-conversion RGB image data (Bayer plane data).

Based upon the vertical/horizontal directional index HV[i,j] determined as in the first embodiment and the diagonal directional index DV[i,j] determined as described above, luminance information Y, i.e., Y[i,j], is calculated for each pixel [i,j] corresponding to an R pixel or a B pixel in the pre-conversion RGB image data. Nine specific directions along which similarity may manifest are defined in correspondence to different combinations of the vertical/horizontal directional index HV[i,j] and the diagonal directional index DN[i,j], as shown in FIG. 18.

Figure 19:
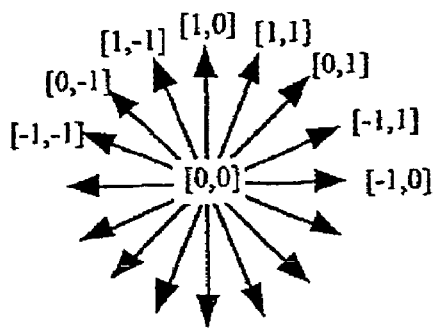
FIG. 19 shows the positions of, and the coefficients assigned to the pixels used when processing a G pixel as the conversion target pixel (G-position luminance generation coefficient pattern)

Y[i,j] is calculated by using an expression selected from expressions (37) through (45) in correspondence to the directional indices [HV,DN], i.e., in correspondence to the specific direction along which similarity manifests. Expression (36) is used when the conversion target pixel [i,j] is a G pixel, whereas one of expressions (37) through (45) is selected in correspondence to the directional indices, as indicated below, when the conversion target pixel [i,j] is not a G pixel. It is to be noted that FIG. 19 shows the positions of, and coefficients assigned to the pixels used in the calculation of the luminance information Y when the conversion target pixel is a G pixel (G-position luminance generation coefficient pattern). FIG. 20 shows the positions of, and coefficients assigned to the pixels used in correspondence to the directional indices in the calculation of the luminance information when the conversion target pixel is an R pixel or a B pixel (R- and B-position luminance generation coefficient patterns).

Expression (37) is used when the directional indices are [0,0].

Expression (38) is used when the directional indices are [0,1].

Expression (39) is used when the directional indices are [0,−1].

Expression (40) is used when the directional indices are [1,0].

Expression (41) is used when the directional indices are [1,1].

Expression (42) is used when the directional indices are [1,−1].

Expression (43) is used when the directional indices are [−1,0].

Expression (44) is used when the directional indices are [−1,1].

Expression (45) is used when the directional indices are [−1,−1].

$$Y[i,j]=Y_G \quad (36)$$

$$Y[i,j]=Y_{RB}\text{hv} \quad (37)$$

$$Y[i,j]=Y_{RB}45 \quad (38)$$

$$Y[i,j]=Y_{RB}135 \quad (39)$$

$$Y[i,j]=Y_{RB}\text{v} \quad (40)$$

$$Y[i,j]=Y_{RB}\text{v}45 \quad (41)$$

$$Y[i,j]=Y_{RB}\text{v}135 \quad (42)$$

$$Y[i,j]=Y_{RB}\text{h} \quad (43)$$

$$Y[i,j]=Y_{RB}\text{h}45 \quad (44)$$

$$Y[i,j]=Y_{RB}\text{h}135 \quad (45)$$

$Y_G$, $Y_{RB}$hv, $Y_{RB}$45, $Y_{RB}$135, $Y_{RB}$v $Y_{RB}$v45, $Y_{RB}$v135, $Y_{RB}$h, $Y_{RB}$h45 and $Y_{RB}$h135 are respectively expressed as in (46) through (55) below.

$$Y_G = \alpha * A[i,j] + \quad (46)$$
$$(\beta/4)*\{A[i-1,j]+A[i+1,j]+A[i,j-1]+A[i,j+1]\}$$

$$Y_{RB}hv = \quad (47)$$
$$(\beta/2)*A[i,j]+\alpha*\{(v1/2)*A[i-1,j]+(v2/2)*A[i+1,j]+$$
$$(u1/2)*A[i,j-1]+(u2/2)*A[i,j+1]\}+$$
$$(\beta/2)*\{(s1/2)*A[i-1,j-1]+(s2/2)*A[i+1,j+1]+$$
$$(t1/2)*A[i+1,j-1]+(t2/2)*A[i-1,j+1]\}$$

$$Y_{RB}45 = \quad (48)$$
$$(\beta/2)*A[i,j]+\alpha*\{(v1/2)*A[i-1,j]+(v2/2)*A[i+1,j]+$$
$$(u1/2)*A[i,j-1]+(u2/2)*A[i,j+1]\}+$$
$$(\beta/2)*\{t1*A[i+1,j-1]+t2*A[i-1,j+1]\}$$

$$Y_{RB}135 = \quad (49)$$
$$(\beta/2)*A[i,j]+\alpha*\{(v1/2)*A[i-1,j]+(v2/2)*A[i+1,j]+$$
$$(u1/2)*A[i,j-1]+(u2/2)*A[i,j+1]\}+$$
$$(\beta/2)*\{s1*A[i-1,j-1]+s2*A[i+1,j+1]\}$$

$$Y_{RB}v = (\beta/2)*A[i,j]+\alpha*\{u1*A[i,j-1]+u2*A[i,j+1]\}+ \quad (50)$$
$$(\beta/2)*\{(s1/2)*A[i-1,j-1]+(s2/2)*A[i+1,j+1]+$$
$$(t1/2)*A[i+1,j-1]+(t2/2)*A[i-1,j+1]\}$$

$$Y_{RB}v45 = (\beta/2)*A[i,j]+\alpha*\{u1*A[i,j-1]+u2*A[i,j+1]\}+ \quad (51)$$
$$(\beta/2)*\{t1*A[i+1,j-1]+t2*A[i-1,j+1]\}$$

$$Y_{RB}v135 = (\beta/2)*A[i,j]+\alpha\{u1*A[i,j-1]+u2*A[i,j+1]\}+ \quad (52)$$
$$(\beta/2)*\{s1*A[i-1,j-1]+s2*A[i+1,j+1]\}$$

$$Y_{RB}h = (\beta/2)*A[i,j]+\alpha*\{v1*A[i-1,j]+v2*A[i+1,j]\}+ \quad (53)$$
$$(\beta/2)*\{(s1/2)*A[i-1,j-1]+(s2/2)*A[i+1,j+1]+$$
$$(t1/2)*A[i+1,j-1]+(t2/2)*A[i-1,j+1]\}$$

$$Y_{RB}h45 = (\beta/2)*A[i,j]+\alpha*\{v1*A[i-1,j]+v2*A[i+1,j]\}+ \quad (54)$$
$$(\beta/2)*\{t1*A[i+1,j-1]+t2*A[i-1,j+1]\}$$

$$Y_{RB}h135 = (\beta/2)*A[i,j]+\alpha*\{v1*A[i-1,j]+v2*A[i+1,j]\}+ \quad (55)$$
$$(\beta/2)*\{s1*A[i-1,j-1]+s2*A[i+1,j+1]\}$$

It is to be noted that the following restrictions (56) apply to the constants (coefficients) in the expressions above. In addition, the constant are each a positive value or 0.

$$\alpha+\beta=1, p+q=1, u1+u2=1, v1+v2=1, s1+s2=1, t1+t2=1 \quad (56)$$

The following is a generally preferred example of constant settings.

$$u1 \approx u2, v1 \approx v2, s1 \approx s2, t1 \approx t2$$

$$(\alpha,\beta)=(1/3,2/3), (4/9,5/9), (5/11,6/11), (1/2,1/2), (5/9,4/9), (3/5, 2/5), (2/3,1/3)$$

The constants $\alpha$ and $\beta$, which are parameters used to determine the R, G, B ratio in the luminance, have a relationship expressed as $Y=\alpha*G+\beta*(R+B)/2$.

3-2-2 Edge Emphasis

Since the Y plane thus obtained only contains positive coefficients, edge emphasis processing is executed to restore the contrast achieving the correct level. The edge emphasis processing may be executed by using a simple fixed filter without taking into consideration any directionality. The band-pass filter used for edge extraction may be, for instance, a Laplacian filter such as that in expression (57) and FIG. 21. Then, an arithmetic operation is executed as expressed in (58) below to obtain the ultimate luminance information Y. A positive value, normally equal to or greater than 1, should be set for the constant K in expression (58).

$$YH[i,j]=\{8*Y[i,j]-(Y[i-1,j]+Y[i+1,j]+Y[i,j-1]+Y[i,j+1]+Y[i-1,j-1]+Y[i+1,j-1]+Y[i-1,j+1]+Y[i+1,j+1])\}/16 \quad (57)$$

$$Y[i,j]=Y[i,j]+K*YH[i,j] \quad (58)$$

3-2-3 Colorimetric System Conversion

The image data are then converted to G-component information as indicated in expression (59) by using the three types of color information, i.e., the Cr and Cb planes obtained as indicated in expressions (8) through (10) or the Cr and Cb planes having undergone desired color difference correction as indicated in (11) as in the fourth embodiment and the Y plane obtained as indicated in expression (58). g1 represents the G-component information resulting from this conversion.

$$g1[i,j]=Y[i,j]-(\beta/2)*Cr[i,j]-(\beta/2)*Cb[i,j] \quad (59)$$

4 G Plane Generation 2

G plane generation 2 is executed as in the fourth embodiment.

5 G Plane Composition

The G plane composition is executed as in the fourth embodiment.

6 Colorimetric System Conversion

The colorimetric system conversion is executed as in the fourth embodiment.

By adjusting the interpolation method in correspondence to the intensity of the color gradient, image generation and restoration, which minimizes both diagonal jaggies and the extent of disruption over color boundary areas, are enabled. In the fifth embodiment, the occurrence of color boundary jaggies manifesting as vertical or horizontal streaks likely to occur in color boundary areas where opposite colors are present in the related art, can be effectively reduced. As a result, an interpolated image of high quality, which does not contain any significant false structure, can be provided.

In the first through fifth embodiments described above, adaptive processing is executed on both the color difference components and the luminance component by using the color gradient as an index and, as a result, a high-quality interpolated image that does not contain any significant extent of color artifacts or false structure is provided. While the adaptive measures taken against color artifacts, in particular, are highly effective in eliminating color moiré and color mottling occurring at a high ISO sensitivity level.

It is to be noted that while an explanation is given above in reference to the embodiments on an example in which the present invention is adopted in processing data expressed in the RGB colorimetric system assuming a Bayer array, the present invention is not limited to this example and may be adopted in conjunction with color filters adopting another array.

In addition, the similarity judgment may be executed by using appropriate computational expressions other than the various computational expressions quoted in the explanation of the embodiments. While various computational expressions to be used in the arithmetic operations for the G plane generation and the Y plane generation are quoted, the present invention is not limited to the examples presented in the embodiments. Luminance information may be generated by using appropriate computational expressions other than those.

While a low-pass filter (see FIG. 16) is used for the color difference correction and a band-pass filter (see FIG. 21) is used for the edge emphasis in the fourth and fifth embodiments described above, the present invention is not limited to these examples and a low-pass filter or a band-pass filter adopting a different characteristic may be used, instead.

Furthermore, while an explanation is given above in reference to the fourth and fifth embodiments in which an optimal method for obtaining through interpolation the color component information to be used for determining the luminance in a color boundary area is selected or the color components are interpolated through weighted addition, the present invention is not limited to these examples. For instance, prior to the processing in 6 Colorimetric system conversion, color difference correction low-pass filter processing may be executed to correct the color differences, and the color difference correction low-pass filter may be turned on/off based upon the results of the color gradient analysis. In such a case, color artifacts manifesting in areas other than color boundary areas can be eliminated and the occurrence of color smudging in the color boundary areas can be prevented. In addition, the type or the size of the color difference correction low-pass filter may be selected in correspondence to the results of the color gradient analysis.

While an explanation is given in reference to the embodiments on an example in which the present invention is adopted in an electronic camera, the present invention is not limited to this example and may be adopted in a video camera that captures dynamic images, or a personal computer or a portable telephone equipped with an image sensor. Namely, the present invention may be adopted in all types of apparatuses that employ an image sensor to generate color image data.

In addition, while an explanation is given above in reference to the embodiments on an example in which a single-plate image sensor is used, the present invention is not limited to this example. It may also be adopted to process image data captured on a double-plate type image sensor. While a given pixel holds information corresponding to a single color component in image data captured with a single-plate image sensor assuming an RGB Bayer array, each pixel holds information corresponding to two color components in image data captured with a double-plate image sensor assuming an RGB Bayer array.

Figure 22:
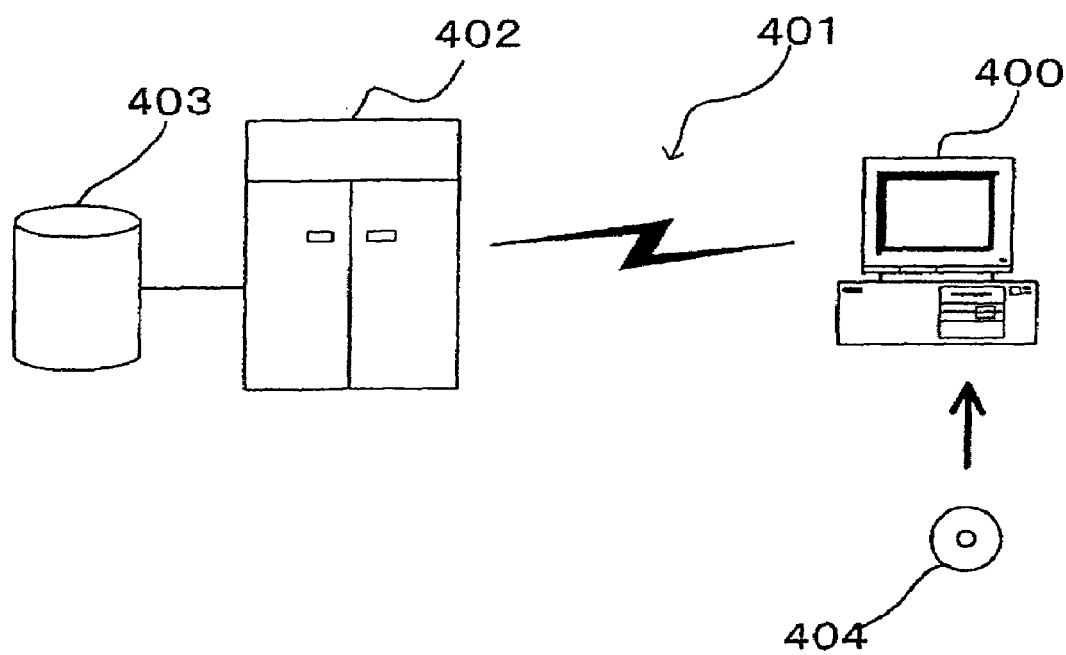

In an application of the present invention in a personal computer or the like, a program related to the processing described above may be provided in a recording medium such as a CD-ROM or through a data signal on the Internet or the like. FIG. 22 shows how the program may be provided in those modes. A personal computer 400 receives the program via a CD-ROM 404. The personal computer 400 is also enabled to connect with a communication Line 401. A computer 402 is a server computer that provides the program stored in a recording medium such as a hard disk 403. The communication line 401 may be a communication line for Internet communication, personal computer communication or the like, or it may be a dedicated communication line. The computer 402 reads out the program from the hard disk 403 and transmits the program to the personal computer 400 via the communication line 401. Namely, the program embodied as a data signal is transmitted on a carrier wave via the communication line 401. Thus, the program can be distributed as a computer-readable computer program product adopting any of various modes including a recording medium and a carrier wave.

The above described embodiments are examples, and various modifications can be made without departing from the spirit and scope of the invention.

What is claimed is:

1. An image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprising:

a similarity factor calculation step in which similarity factors are calculated for each pixel in the first image to determine an extent of similarity change, wherein each similarity factor is a sum of at least absolute differences between color information corresponding to different color components of said each pixel and its horizontally adjacent neighbors, or of said each pixel and its vertically adjacent neighbors;

a color difference information generation step in which color difference information is generated by using color information in the first image, based upon the similarity factors having been calculated;

a temporary color difference information correction step in which the generated color difference information is corrected;

a color gradient analysis step in which a color gradient indicating an extent of color change is determined based upon the color difference information having been corrected; and an image conversion step in which the first image is converted to the second image based upon the color gradient having been determined.

2. An image processing method according to claim 1, wherein:
the image conversion step includes a color difference information correction step in which correction processing is executed based upon the color gradient of the color difference information having been corrected by using the color information in the first image.

3. An image processing method according to claim 2, wherein:
in the color gradient analysis step, a color index is generated based upon color difference information indicating a color difference between the color components making up the colorimetric system used to express the first image and the color gradient is determined by ascertaining the extent of color change within a plane of the color index.

4. An image processing method according to claim 2, wherein:
in the color difference information correction step, a correction filter effective over a predetermined range is applied to a color difference plane if a target pixel has a color gradient smaller than a predetermined value, and no correction processing is executed or a correction filter effective over a range narrower than the predetermined range is applied if the target pixel has a color gradient greater than the predetermined value.

5. An image processing method according to claim 4, wherein:
a differentiation filter used to determine the color gradient in the color gradient analysis step has a size matching the size of the correction filter effective over the predetermined range.

6. An image processing method according to claim 1, wherein:
in the color gradient analysis step, a color index to be used to evaluate color in correspondence to each pixel is generated based upon the color difference information and the color gradient is determined based upon the color index having been generated.

7. An image processing method according to claim 6, wherein:
in the color gradient analysis step, the color gradient is determined by executing a differentiation operation to determine a gradient within a plane of the color index having been generated.

8. An image processing method according to claim 6, wherein:
in the color gradient analysis step, a color index is generated by using all types of color difference information indicating a color difference between primary color components constituting the colorimetric system used to express the first image and the color gradient is determined by ascertaining the extent of color change within a plane of the color index.

9. An image processing method according to claim 1, wherein:
in the color gradient analysis step, the color gradient is determined by isotropically executing a differentiation operation along a plurality of directions.

10. An image processing method according to claim 9, wherein:
in the color gradient analysis step, the color gradient is calculated through a first-order differentiation operation.

11. An image processing method according to claim 1, wherein:
in the color difference information generation step, the color difference information is generated by adopting a method selected from at least three different methods.

12. An image processing method according to claim 11, wherein:
in the similarity factor calculation step, similarity factors corresponding to at least two directions are calculated by using the color information in the first image, similarity manifesting along each direction is judged among at least three different classifications based upon the similarity factors having been calculated and one of the three different methods is selected in correspondence to a judged classification.

13. An image processing method according to claim 1, wherein:
the image conversion step includes a second image generation step in which color difference information is generated by using at least either one of the color difference information having been generated in the color difference information generation step or the temporary color difference information having been corrected in the temporary color difference information correction step, as color difference information for the second image.

14. An image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprising:
a color difference information generation step in which color difference information is generated by using color information in the first image;
a color gradient analysis step in which a color gradient indicating an extent of color change is determined based upon the color difference information having been generated;
a luminance information generation step in which luminance information is generated by using color information in the first image, based upon the color gradient having been determined; and
a second image generation step in which a second image is generated by combining the color difference information having been generated and the luminance information having been generated.

15. An image processing method according to claim 14, wherein:
in the color gradient analysis step, a color index is generated by using color difference information indicating a color difference between a primary color component constituting the colorimetric system used to express the first image and a complementary color component corresponding to an opposite color and the color gradient is determined by ascertaining the extent of color change within a plane of the color index.

16. An image processing method according to claim 14, wherein:
in the second image generation step, a colorimetric system conversion is executed in the second image, from the color difference information and the luminance information to color components constituting the colorimetric system used to express the first image.

17. An image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprising:

a color difference information generation step in which color difference information is generated by using color information in the first image;

a color gradient analysis step in which a color gradient indicating an extent of color change is determined based upon the color difference information having been generated; and an image conversion step in which the first image is converted to the second image based upon the color gradient having been determined, wherein:

the plurality of pixels constituting the first image and the plurality of pixels constituting the second image are arrayed in matching positional arrangements to achieve a direct correspondence;

in the image conversion step, (1) the first image is converted to the second image by adjusting a contribution factor of the color information in the first image present at a position corresponding to a position of a processing target pixel in the second image in correspondence to the steepness of color gradient, and (2) the contribution factor of the color information in the first image at the position corresponding to the position of the processing target pixel in the second image, with which the color information in the first image is to be allowed to affect color information corresponding to a color component carrying luminance in the second image, is adjusted in correspondence to the color gradient;

in the image conversion step, the first image is converted to the second image by adopting at least a first method through which color information corresponding to one color component in the second image is generated by using color information corresponding to a plurality of color components in the first image and a second method through which color information corresponding to one color component in the second image is generated by using color information corresponding to only one color component in the first image;

in the color gradient analysis step, a decision is made as to whether or not a color boundary is present based upon the color gradient having been determined; and in the image conversion step, the first method is adopted to process a pixel determined not to contain a color boundary through the color gradient analysis step and the second method is adopted to process a pixel determined to contain a color boundary through the color gradient analysis step.

18. An image processing method according to claim 17, wherein:

when the first method is adopted in the image conversion step, color information corresponding to the color component carrying luminance in the first image is generated for a pixel at which color information corresponding to the color component carrying luminance is missing through interpolation processing executed by using color information corresponding to a color component matching the color component carrying luminance and color information corresponding to a color component other than the color component carrying luminance, and the first image is converted to the second image by using the color information corresponding to the color component carrying the luminance in the first image having been generated through the interpolation processing.

19. An image processing method according to claim 18, wherein:

when the first method is adopted in the image conversion step, color information corresponding to the color component carrying luminance in a colorimetric system other than the colorimetric system used to express the first image is generated for all the pixels by using the color information corresponding to the color components making up the first image and the first image is converted to the second image by using the color information corresponding to the color component carrying the luminance in the other colorimetric system having been generated.

20. An image processing method for converting a first image, which is expressed in a colorimetric system made up of a plurality of color components and is constituted of a plurality of pixels each holding color information corresponding to a single color component, to a second image constituted with a plurality of pixels all holding color information corresponding to at least one common color component, comprising:

a similarity factor calculation step in which similarity factors are calculated for each pixel in the first image to determine an extent of similarity change, wherein each similarity factor is a sum of at least absolute differences between color information corresponding to different color components of said each pixel and its horizontally adjacent neighbors, or of said each pixel and its vertically adjacent neighbors;

a color difference information generation step in which color difference information for the second image is generated by using color information in the first image, based upon the similarity factors having been calculated;

a temporary color difference information correction step in which the generated color difference information is corrected;

a color gradient analysis step in which a color gradient indicating an extent of color change is determined based upon the color difference information having been corrected; and a color difference information correction step in which the color difference information for the second image is corrected based upon the color gradient having been determined, wherein:

in the color difference correction step, the color difference information for the second image is corrected independently of luminance information for the second image.

21. An image processing apparatus, comprising:
a control device that executes the steps in an image processing method according to claim 1.

22. An image processing apparatus, comprising:
a control device that executes the steps in an image processing method according to claim 14.

23. An image processing apparatus, comprising:
a control device that executes the steps in an image processing method according to claim 20.

24. A computer-readable recording medium containing an image processing computer program that enables a computer to execute the steps in an image processing method according to claim 1.

25. A computer-readable recording medium containing an image processing computer program that enables a computer to execute the steps in an image processing method according to claim 14.

26. A computer-readable recording medium containing an image processing computer program that enables a computer to execute the steps in an image processing method according to claim 20.

* * * * *